(12) United States Patent
Laidler et al.

(10) Patent No.: US 8,439,232 B2
(45) Date of Patent: May 14, 2013

(54) MANUAL PUMP TYPE FLUID DISPENSER AND A METHOD OF MANUFACTURING SUCH A DISPENSER

(75) Inventors: Keith Laidler, Stourbridge (GB); Timothy Rodd, Hants (GB)

(73) Assignee: Leafgreen Limited, Stourbridge, West Midlands (GB)

( * ) Notice: Subject to any disclaimer, the term of this patent is extended or adjusted under 35 U.S.C. 154(b) by 405 days.

(21) Appl. No.: 12/671,470

(22) PCT Filed: Jul. 28, 2008

(86) PCT No.: PCT/GB2008/002558
§ 371 (c)(1),
(2), (4) Date: Mar. 19, 2010

(87) PCT Pub. No.: WO2009/016352
PCT Pub. Date: Feb. 5, 2009

(65) Prior Publication Data
US 2010/0193547 A1 Aug. 5, 2010

(30) Foreign Application Priority Data
Aug. 2, 2007 (GB) .................................. 0715224.2

(51) Int. Cl.
*B65D 37/00* (2006.01)
*B65D 88/54* (2006.01)
*B67D 7/76* (2010.01)
*G01F 11/00* (2006.01)

(52) U.S. Cl.
USPC .................. 222/207; 222/190; 222/321.8

(58) Field of Classification Search .................. 222/190, 222/207, 321.8, 383.1, 189.06, 189.11; 239/329–331, 239/333, 412, 413, 416, 416.4, 416.5, 417.3, 239/417.5, 423, 541, 570, 579
See application file for complete search history.

(56) References Cited

U.S. PATENT DOCUMENTS 3,749,290 A * 7/1973 Micallef ...................... 222/207
4,082,223 A * 4/1978 Nozawa ....................... 239/333
(Continued)

FOREIGN PATENT DOCUMENTS
DE 19911776 9/2000
DE 102006031169 5/2007
(Continued)

OTHER PUBLICATIONS

International Search Report and Written Opinion issued in parent PCT Application No. PCT/GB2008/002558, filed Jul. 28, 2008 (14 pgs).

(Continued)

*Primary Examiner* — Kevin P Shaver
*Assistant Examiner* — Vishal Pancholi
(74) *Attorney, Agent, or Firm* — Chernoff, Vilhauer, McClung & Stenzel, LLP

(57) ABSTRACT

A manual pump action dispenser for dispensing at least one liquid from a container, the dispenser comprising a base and a cap (114) having an outlet (144) for the liquid, the base being mountable to or forming part of a container and the cap (114) being mountable to the base for movement relative to the base between a rest position and an actuated position, the dispenser further comprising a flexible insert (116) locatable between the base and the cap (114) to define a first pump chamber (122) for dispensing said at least one liquid, the insert being adapted to engage with the base to define an inlet through which said at least one liquid to be dispensed can enter the first pump chamber, the dispenser further comprising an inlet valve operable to enable liquid to enter the first pump chamber (122) through the inlet and an outlet valve arrangement operable to control the release of liquid from the first pump chamber through the outlet, in which the insert also defines a second pump chamber (123) for dispensing a second fluid.

32 Claims, 18 Drawing Sheets

U.S. PATENT DOCUMENTS

| | | | | |
|---|---|---|---|---|
| 4,088,248 | A * | 5/1978 | Blake | 222/207 |
| 4,155,487 | A * | 5/1979 | Blake | 222/207 |
| 4,993,214 | A * | 2/1991 | Corba | 53/471 |
| 5,114,052 | A * | 5/1992 | Tiramani et al. | 222/207 |
| 5,205,441 | A * | 4/1993 | Andris | 222/207 |
| 5,238,156 | A * | 8/1993 | Andris | 222/207 |
| 5,462,208 | A * | 10/1995 | Stahley et al. | 222/207 |
| 5,476,195 | A * | 12/1995 | Oder et al. | 222/207 |
| 5,518,147 | A * | 5/1996 | Peterson et al. | 222/153.07 |
| 5,570,819 | A * | 11/1996 | Uehira et al. | 222/190 |
| 5,664,703 | A * | 9/1997 | Reifenberger et al. | 222/207 |
| 6,082,588 | A * | 7/2000 | Markey et al. | 222/137 |
| 6,168,050 | B1 * | 1/2001 | Battegazzore | 222/207 |
| 6,612,468 | B2 * | 9/2003 | Pritchett et al. | 222/190 |
| 6,712,243 | B2 * | 3/2004 | Rossignol | 222/207 |
| 6,729,501 | B2 * | 5/2004 | Peterson | 222/135 |
| 6,793,100 | B2 * | 9/2004 | Iizuka et al. | 222/145.5 |
| 6,840,408 | B1 * | 1/2005 | Foster et al. | 222/190 |
| 6,978,913 | B2 * | 12/2005 | Rousselet et al. | 222/207 |
| 7,201,293 | B2 * | 4/2007 | Iizuka et al. | 222/145.6 |
| 7,246,723 | B2 * | 7/2007 | Santagiuliana | 222/209 |
| 7,275,661 | B2 * | 10/2007 | Iizuka et al. | 222/145.6 |
| 7,401,714 | B2 * | 7/2008 | Iizuka et al. | 222/145.6 |
| 2004/0060945 | A1 * | 4/2004 | Cater et al. | 222/1 |
| 2005/0029302 | A1 * | 2/2005 | Iizuka et al. | 222/190 |
| 2005/0115984 | A1 * | 6/2005 | Pritchett et al. | 222/95 |
| 2005/0115988 | A1 * | 6/2005 | Law et al. | 222/145.5 |
| 2006/0273112 | A1 * | 12/2006 | Fuchs | 222/207 |
| 2007/0119864 | A1 * | 5/2007 | Tsai | 222/137 |
| 2007/0194054 | A1 * | 8/2007 | Ganzeboom et al. | 222/190 |

FOREIGN PATENT DOCUMENTS

| | | |
|---|---|---|
| DE | 202007004405 | 8/2007 |
| EP | 0906873 | 4/1999 |
| EP | 1754542 | 2/2007 |
| WO | 98/30332 | 7/1998 |
| WO | 03/041870 | 5/2003 |

OTHER PUBLICATIONS

English Abstract (translated by espacenet) for EP 0906873 (A1), published Apr. 7, 1999, 1 page.

English Abstract (translated by espacenet) for DE 19911776 (A1), published Sep. 21, 2000, 1 page.

English Abstract (translated by espacenet) for DE102006031169 (A1), published May 31, 2007, 1 page.

\* cited by examiner

MANUAL PUMP TYPE FLUID DISPENSER AND A METHOD OF MANUFACTURING SUCH A DISPENSER

The present invention relates to manually actuated pump type fluid dispensers. The invention also relates to a method of manufacturing manual pump type fluid dispensers.

Manually actuated pump type fluid dispensers are commonly used to provide a means by which fluids can be dispensed from a non-pressurised container. Typically, dispensers of this kind have a pump arrangement which is located above the container when in use. The pump includes a pump chamber connected with the container by means of an inlet having an inlet valve and with a dispensing outlet via an outlet valve. To actuate the dispenser, a user manually applies a force to an actuator to reduce the volume of the pump chamber and pressurise the fluid inside. Once the pressure in the chamber reaches a pre-determined value, the outlet valve opens and the fluid is expelled through the outlet. When the user removes the actuating force, the volume of the chamber increases and the pressure in the chamber falls. This closes the outlet valve and draws a further charge of fluid up into the chamber through the inlet. A range of fluids can be dispensed this way this way including pastes, gels, liquid foams and liquids. In certain applications, the fluid is dispensed in the form of an atomised spray, in which case the outlet will comprise an atomising nozzle. The actuator may be push button or cap, though in some applications the actuator arrangement includes a trigger that can be pulled by a user's fingers.

A large number of commercial products are presented to consumers in a manual pump type dispenser, including, for example, tooth paste, antiperspirant, deodorant, perfumes, air fresheners, antiseptics, paints, insecticides, polish, hair care products, pharmaceuticals, shaving gels and foams, water and lubricants.

There are a number of drawbacks associated with conventional pump-action dispensers. Firstly, many of the conventional devices tend to be extremely complex in design and typically comprise numerous different component parts. In some designs there are between 8 and 10 individual components, with 10 to 14 individual components being used in dispensers having a trigger actuator. As a consequence, these devices can be costly to manufacture due to the amount of material required to form the individual components and the assembly processes involved. Secondly, many of the conventional devices tend to be bulky (which again increases the raw material costs) and a proportion of this bulk is invariably disposed inside the container to which the device is attached. This creates a drawback in that the nozzle device takes up a proportion of the internal volume of the container, which can be a particular problem in small containers where the available space inside the container is limited. Finally, the size of the pump is also dictated to certain extent by the size of the container to which it is attached. Thus, the size of the pump is usually restricted in small containers, and especially small containers with narrow necks, and this limits the amount of pressure that can be generated by the pump as well as the volume of fluid that can be dispensed, and, for this reason, can be detrimental to the performance of the device.

Many of the products which are supplied in a manual pump action dispenser are highly cost sensitive and there is constant pressure on the manufactures of dispensers to reduce manufacturing costs without adversely affecting the performance of the dispenser.

There is a desire for a manually actuated pump dispenser which is:
simpler in design;
utilises fewer components; and
is easy to operate and functions effectively.

In accordance with a first aspect of the invention, there is provided a manual pump action dispenser for dispensing at least one liquid from a container, the dispenser comprising a base and a cap having an outlet for the liquid, the base being mountable to or forming part of a container and the cap being mountable to the base for movement relative to the base between a rest position and an actuated position, the dispenser further comprising a flexible insert locatable between the base and the cap to define a first pump chamber for dispensing said at least one liquid, the insert being adapted to engage with the base to define an inlet through which said at least one liquid to be dispensed can enter the first pump chamber, the dispenser further comprising an inlet valve operable to enable liquid to enter the first pump chamber through the inlet and an outlet valve arrangement operable to control the release of liquid from the first pump chamber through the outlet, in which the insert also defines a second pump chamber for dispensing a second fluid.

The dispenser may comprise an inlet valve operable to enable the second fluid to enter the second chamber from a fluid source.

The dispenser may comprise an outlet valve operable to enable the second fluid to pass from the second pump chamber to the outlet.

An integral portion of the insert may form a flexible valve member of the first pump chamber inlet valve.

The inlet valve for the first chamber may be a duck, fart or flap valve.

An integral portion of the insert may form a flexible valve member of the first pump chamber outlet valve.

An integral portion of the insert may form a flexible valve member of the second pump chamber inlet valve.

An integral portion of the insert may form a flexible valve member, of the second pump chamber outlet valve.

The second pump chamber may be configured to dispense air and the inlet valve for the second pump chamber is configured to open so as to admit ambient air into the second pump chamber when the pressure in the second pump chamber is lower than the ambient air pressure by a predetermined amount.

Alternatively, the second pump chamber may be configured to dispense a second liquid, the insert defining a second inlet through which the second liquid may be drawn into the second pump chamber.

The flexible insert may have a body portion which defines a bore forming part of the inlet to the first pump chamber, the insert being mountable to a dip tube so that the dip tube is in fluid connection with the bore.

Where the second pump chamber is configured to dispense a second liquid, the body portion may define a second bore forming part of the inlet to the second pump chamber, the insert being mountable to a second dip tube so that the second dip tube is in fluid connection with the second bore.

The base may have an annular wall or neck, the cap having closed end and an annular side wall extending from the closed end to locate about the outside of the neck, at least part of the insert being received within the neck, the insert having portions which contact the inner surface of the cap to define the first and second pump chambers between itself and the cap.

In one embodiment, the main body is at least partially received within the neck, the insert having first bell region which extends from the body for contact with the inner surface of the cap to define the first pump chamber and a second bell region which extends from the main body to contact and form a seal with the inner surface of the neck, the second bell carrying a seal member which contacts the side wall of the cap in spaced relation from the first bell member, so as to define the second pump chamber.

The bore may be defined within the main body of the insert and opens into the first pump chamber, the insert having one or more flexible valve members configured to allow a first liquid to flow through the bore into the first pump chamber but not in the reverse direction.

Where the second chamber is configured to dispense a second liquid, a second bore may be defined in the main body which opens into the second pump chamber, the insert having one or more flexible valve members configured to allow a second liquid to flow through the second bore into the second pump chamber but not in the reverse direction.

The base may be adapted to be mounted to an outlet of a container for the at least one liquid or the base may be an integral part of a container for the at least one liquid.

Where the second chamber is configured to dispense air, the dispenser may be arranged to dispenser a mixture of air and the at least one liquid as a foam. In this embodiment, outlet passageways from the first and second chambers converge such that, in use when the dispenser is actuated, air from the second pump chamber is mixed with the at least one liquid from the first pump chamber. A filter for refining the foam may be located in an outlet passage along which the mixture of air and liquid pass before being dispensed. The filter could be of any suitable type but may be a plug of open celled material, some other 3D mesh structure or it may be in the form of one or more filter screens. The dispenser outlet may include a fluid flow passageway from the first pump chamber which includes a, spray orifice opening into an outlet passageway of increased diameter, the outlet from the second chamber comprising a fluid flow passageway which enters the increased diameter outlet passage, the arrangement being such that in use, the liquid forms a spray when passing through the spray orifice into the larger diameter outlet passageway where it mixes with the air to form a foam.

In accordance with a second aspect of the invention, there is provided a manual pump dispenser comprising a container and a cap, the container having a main body for holding a volume of liquid to be dispensed, an open neck region though which the liquid to be dispensed can be introduced into the container and an integral dip tube extending from within or close to the neck region towards a base of the container, the cap having an outlet for the liquid and being mountable to the container for movement between a rest position and an actuated position, the dispenser further comprising a flexible insert locatable between the neck region of the container and the cap to define a pump chamber for the liquid, the insert defining an inlet through which the liquid to be dispensed can enter the pump chamber from the dip tube, the dispenser also comprising a one way inlet valve operable to enable liquid to enter the pump chamber through the inlet and a one way outlet valve arrangement operable to control the release of liquid from the pump chamber into the outlet.

The cap may be connected with the container by a flexible lanyard which may be adapted to twist about a longitudinal axis of the lanyard. The lanyard may be connected to the cap and to the container by means of frangible links.

A portion of the insert may form a valve member of the pump chamber inlet valve, which may be a duck or flap valve.

A portion of the flexible insert may form a valve member of the pump chamber outlet valve.

The flexible insert may have a body portion with a bore which comprises the inlet to the pump chamber, the insert being mountable on the dip tube so that the dip tube is in fluid connection with the bore. The insert may also comprise a first diaphragm member that extends from the body portion for contact with the cap, the pump chamber being defined between the first diaphragm member and the cap. The first diaphragm member may have a generally frusto-conical portion that extends away from the body portion and a seal region of enlarged thickness which engages with the cap. The first diaphragm member may further comprise a portion that engages with a surface of the cap to define a pump chamber outlet valve member, the outlet valve member being resiliently biased into contact with the surface to close an outlet passage connecting the pump chamber and the liquid outlet in the cap. The cap may have inner and outer annular wall members which define between themselves an outlet channel for the pump chamber, and the outlet valve member may be resiliently biased to contact one of the wall members to close the outlet of the pump chamber.

The flexible insert may comprise a second diaphragm member that extends from the body for contact with an inner surface of the neck region of the container. The second diaphragm member may have a shoulder region which rests on a flange formed at an outer end of the neck. The second diaphragm member may extend into the neck beyond the flange for contact with the inner surface of the neck and may be resiliently biased into contact with the inner surface of the neck. The second diaphragm member may be arranged to form an inlet valve member for controlling the admission of air into the container during use.

In some embodiments, the flexible inlet comprises a further seal member which contacts the inner surface of the cap in spaced relation to the first diaphragm member to define a second pump chamber between the cap, the first diaphragm member and the further seal member. The further seal member may be an extension of the second diaphragm member. The second pump chamber may be configured to pressurise air for mixture with the liquid, in which case the further seal member may be configured to act as an inlet valve member to control the admission of atmospheric air into the second pump chamber during use. Alternatively, the second pump chamber can be configured to dispense a second liquid, the container being divided into two sections, a first section for containing the first liquid and a second section for containing a second liquid, the first container section being fluidly connected with the first pump chamber and the second container section being fluidly connected with the second pump chamber. The dispenser may have a fluid passage that connects the second pump chamber with the outlet in the cap, a portion of the flexible insert being configured to act in use as an outlet valve member for controlling the release of fluid from the second pump chamber into the outlet.

The outlet may include a nozzle adapted to form an atomised spray of a liquid passing through it in use.

The dispenser may have a trigger type actuation surface adapted to be gripped by a user's fingers and pulled towards the container to actuate the dispenser. In one embodiment, the cap is mounted to the container for pivotal movement between the rest and actuated positions, the trigger type actuation surface being formed integrally with the cap. In an alternative arrangement, the cap is mounted to the container for generally linear movement between the rest and actuated positions, the dispenser further comprising a trigger actuator having the trigger type actuation surface, the actuator being pivotably mounted to the container and adapted to engage the cap and move it from the rest position towards the actuated position when pulled by a user.

In accordance with a third aspect of the invention, there is provided a manual pump action dispenser for dispensing a liquid from a container, the dispenser comprising a base and a cap having an outlet for the liquid, the base being mountable to or forming part of a container and the cap being mountable to the base for movement between a rest position and an actuated position, the dispenser further comprising a flexible insert locatable between the base and the cap to define a pump chamber for the liquid, the insert being adapted to engage with the base to define an inlet through which the liquid to be dispensed can enter the pump chamber, the dispenser further comprising a one way inlet valve operable to enable liquid to enter the pump chamber through the inlet and a one way outlet valve arrangement operable to control the release of liquid from the pump chamber into the outlet, in which the cap is manufactured integrally with the base and is connected thereto by means of a flexible lanyard.

In accordance with a fourth aspect of the invention manual pump action dispenser for dispensing a liquid from a container, the dispenser comprising a base and a cap having an outlet for the liquid, the base being mountable to or forming part of a container and the cap the cap being mountable to the base for movement between a rest position and an actuated position, the dispenser further comprising a flexible insert locatable between the base and the cap to define a pump chamber for the liquid, the insert being adapted to engage with the base to define an inlet through which the liquid to be dispensed can enter the pump chamber, the dispenser further comprising a one way inlet valve operable to enable liquid to enter the pump chamber through the inlet and a one way outlet valve arrangement operable to control the release of liquid from the pump chamber into the outlet, the dispenser having a trigger type actuation surface adapted to be gripped by a users fingers and pulled towards the container to actuate the dispenser.

In a manual pump dispenser in accordance with the first and fourth aspects of the invention, the cap may be connected to the base by means of a flexible lanyard.

In a manual pump dispenser in accordance with any of the first, third or fourth aspects of the invention in which the cap is connected to the base by means of a flexible lanyard, the lanyard may be adapted to twist about a longitudinal axis of the lanyard and may be connected to the cap and to the base by means of frangible links.

In a manual pump dispenser in accordance with either of the third or fourth aspects of the invention, a portion of the insert may form a valve member of the pump chamber inlet valve, which may be a duck or flap valve.

In a manual pump dispenser in accordance with either of the third or fourth aspects of the invention, a portion of the flexible insert may form a valve member of the pump chamber outlet valve.

In a manual pump dispenser in accordance with any of the first, third or fourth aspects of the invention the dispenser may further comprise a dip tube.

In a manual pump dispenser in accordance with any of the first, third or fourth aspects of the invention and which comprises a dip tube, the flexible insert may have a body portion with a bore which forms the inlet to the (first) pump chamber, the insert being mountable on the dip tube so that the dip tube is in fluid connection with the bore. The insert may also have a first diaphragm member that extends from the body portion for contact with the cap, the pump chamber being defined between the first diaphragm member and the cap. The first diaphragm member may have a generally frusto-conical portion that extends away from the body portion and a seal region of enlarged thickness which engages with the cap. The first diaphragm member may further comprise a portion that engages with a surface of the cap to define a pump chamber outlet valve member, the outlet valve member being resiliently biased into contact with the surface to close an outlet passage connecting the pump chamber and the liquid outlet in the cap. The cap may include inner and outer annular wall members which define between themselves an outlet channel for the pump chamber, the outlet valve member being resiliently biased to contact one of the wall members to close the outlet of the pump chamber. The flexible insert may comprise a second diaphragm member that extends from the body for contact with an inner surface of the base. The second diaphragm member may have a shoulder region which rests on a flange formed at an outer end of the base. The second diaphragm member may extend into the base beyond the flange for contact with the inner surface of the base and may be resiliently biased into contact with the inner surface of the base. The second diaphragm member may form an inlet valve member for controlling the admission of air through the base into the container during use.

In a manual pump dispenser in accordance with the third or fourth aspects of the invention the insert may also define a second pump chamber for dispensing a second fluid together with the liquid.

In a manual pump dispenser in accordance with the third or fourth aspects of the invention in which the insert defines a second pump chamber for dispensing a second fluid together with the liquid, the flexible inlet may have a further seal member which contacts the inner surface of the cap in spaced relation to the first diaphragm member to define the second pump chamber between the cap, the first diaphragm member and the further seal member. The further seal member may be an extension of the second diaphragm member. The second pump chamber may be configured to pressurise air for mixture with the liquid, the further seal member being configured to act as an inlet valve member to control the admission of atmospheric air into the second pump chamber during use. Alternatively, the second pump chamber can be configured to dispense a second liquid. The dispenser may have a fluid passage connecting the second pump chamber with the outlet in the cap and a portion of the flexible insert may be configured to act in use as an outlet valve member for controlling the release of fluid from the second pump chamber into the outlet.

In a manual pump dispenser in accordance with any aspect of the invention the outlet may include a nozzle adapted to form an atomised spray of a liquid passing through it in use.

In a manual pump dispenser in accordance with the either of the first or third aspects of the invention, the dispenser may have a trigger type actuation surface adapted to be gripped by a user's fingers and pulled to actuate the dispenser.

In a manual pump dispenser in accordance with any aspect of the invention in which the dispenser has a trigger type actuation surface, the cap may be mounted to the base for pivotal movement between the rest and actuated positions and the trigger type actuation surface may be formed integrally with the cap. Alternatively, the cap can be mounted to the base for generally linear movement between the rest and actuated positions, in which case the dispenser may further comprise a trigger actuator with the trigger type actuation surface, the actuator being pivotably, mounted to the base and adapted to engage the cap and move it from the rest position towards the actuated position when pulled by a user.

In a manual pump dispenser in accordance with either of the third or fourth aspects of the invention, the base may be adapted to be mounted to a container for the liquid. Alternatively, the base may comprise the neck region of a container for holding a liquid to be dispensed.

In a manual pump dispenser in accordance with the second aspect of the invention or any one of the first, third or fourth aspects of the invention when the base is an integral part of the container, the whole dispenser may consist of only two separately manufactured parts, the flexible insert being a first part and the cap and the container being a second, integrally formed component part.

In accordance with a fifth aspect of the invention, there is provided a method of manufacturing a manual pump dispenser in accordance with the second aspect of the invention or any one of the first, third or fourth aspects of the invention when the base is an integral part of the container, the method comprising forming a preform for the container, the preform having an inner layer and at least one outer layer; subsequently expanding the at least one outer layer of the preform to form the main body portion of the container.

The inner layer of the preform may form an integral dip tube for the container.

Where the cap is connected with the neck or base by means of a lanyard, the method in accordance with the fifth aspect of the invention may further comprise: injection moulding the cap and lanyard; the step of injection moulding the cap and lanyard at least partially overlapping with the step of expanding the at least one outer layer of the preform.

The method in accordance with the fifth aspect of the invention may further comprise injection moulding the preform in a first moulding station, the preform being transported to a second moulding station at which the at least one outer layer is expanded. In which case, the cap and lanyard may be moulded at the second moulding station. The first moulding station may be positioned above the second moulding station. The first and second moulding stations may be formed as part of a single mould tool and the preform may be transported from the first to the second station via an internal passage in the tool. The method may also include holding the preform in at least one intermediate station between the first and second moulding stations.

Several embodiments of the invention will now be described, by way of example only, with reference to the accompanying drawings, in which.

Dispensers in accordance with the invention can be manufactured using any suitable apparatus and methods but can be at least partly manufactured in a convenient and economical manner using the various moulding apparatus and methods described in the applicant's co-pending patent applications Nos. PCT/GB2006/002751 and GB 0701210, the contents of both of which are hereby incorporated by reference. The reader should refer to these and related patent applications for a full description of the apparatus and methods. However, for the sake of completeness, a brief description of the stacked moulding apparatus and methods disclosed in GB 0701210 will now follow with reference to FIGS. 1 to 4.

Figure 1:
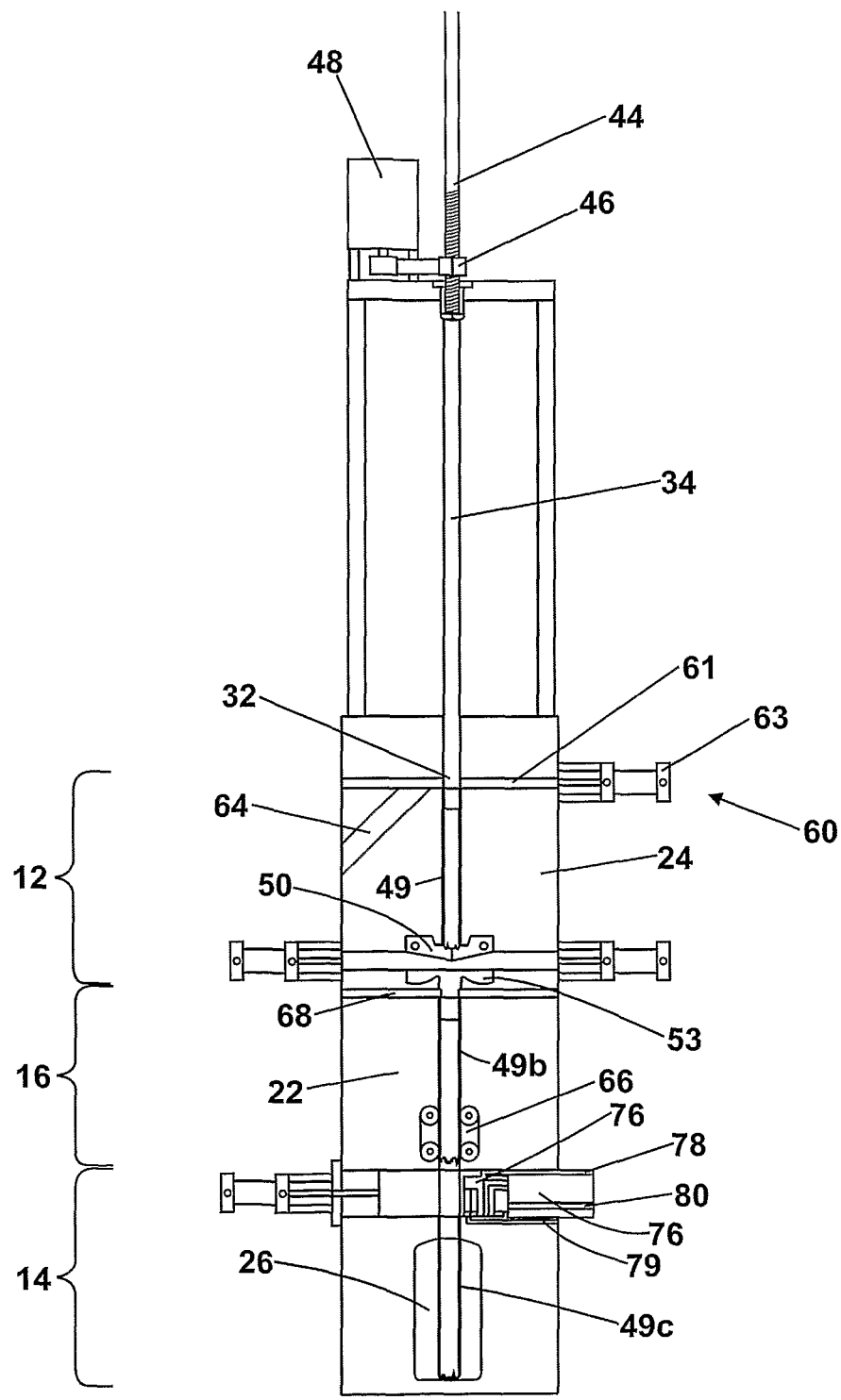
FIG. 1 is side elevation of part of a first embodiment of a moulding apparatus which can be used to produce at least part of a dispenser in accordance with the invention, showing the apparatus in a condition in which closure members which form a base region of a preform injection moulding cavity are closed.
Figure 2:
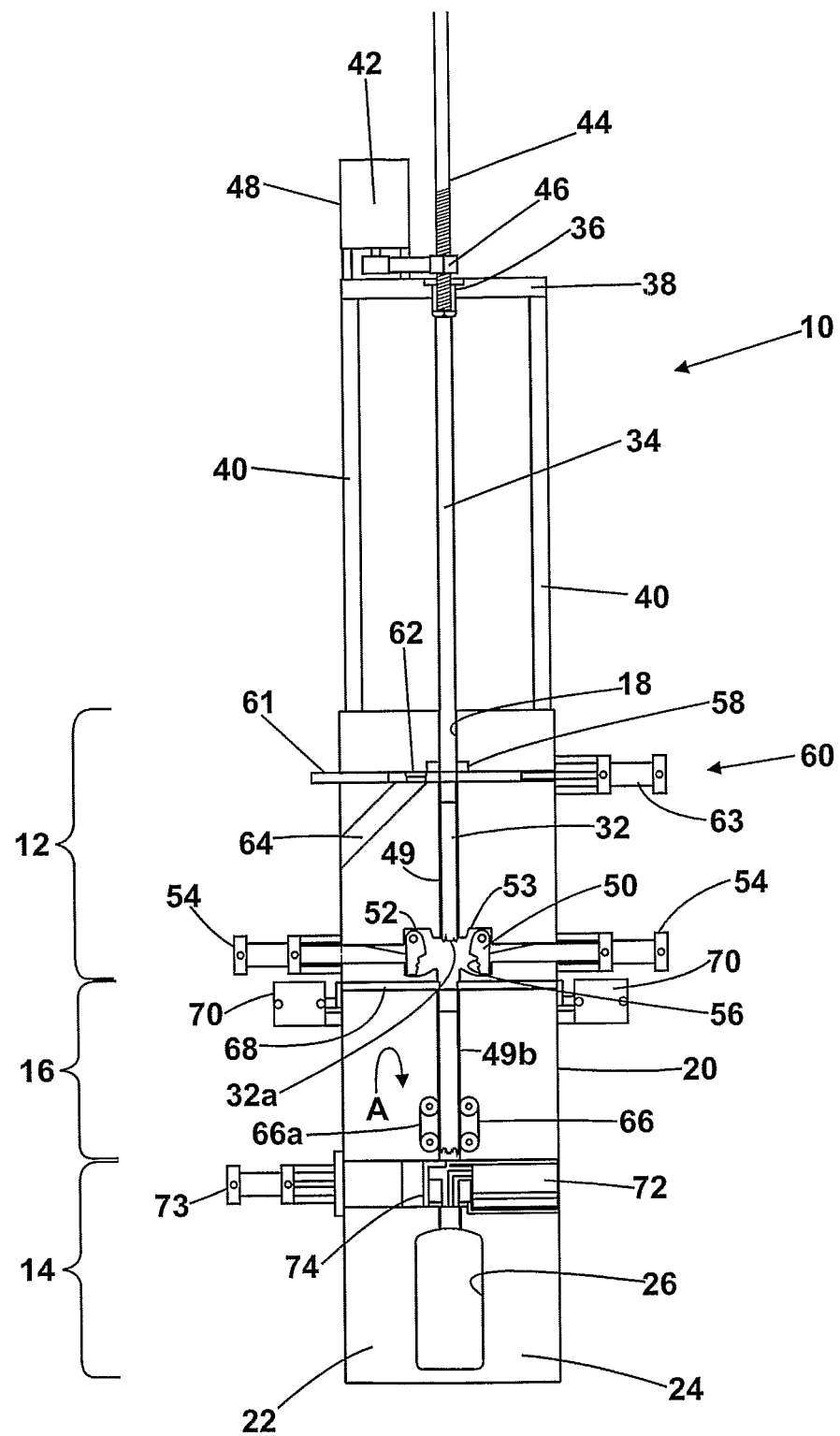
FIG. 2 is view similar to that of FIG. 1 but showing the moulding apparatus in a condition in which the closure members are in an open position so that a preform moulded the injection moulding cavity can be transferred from the injection moulding cavity to a lower processing station.
Figure 3:
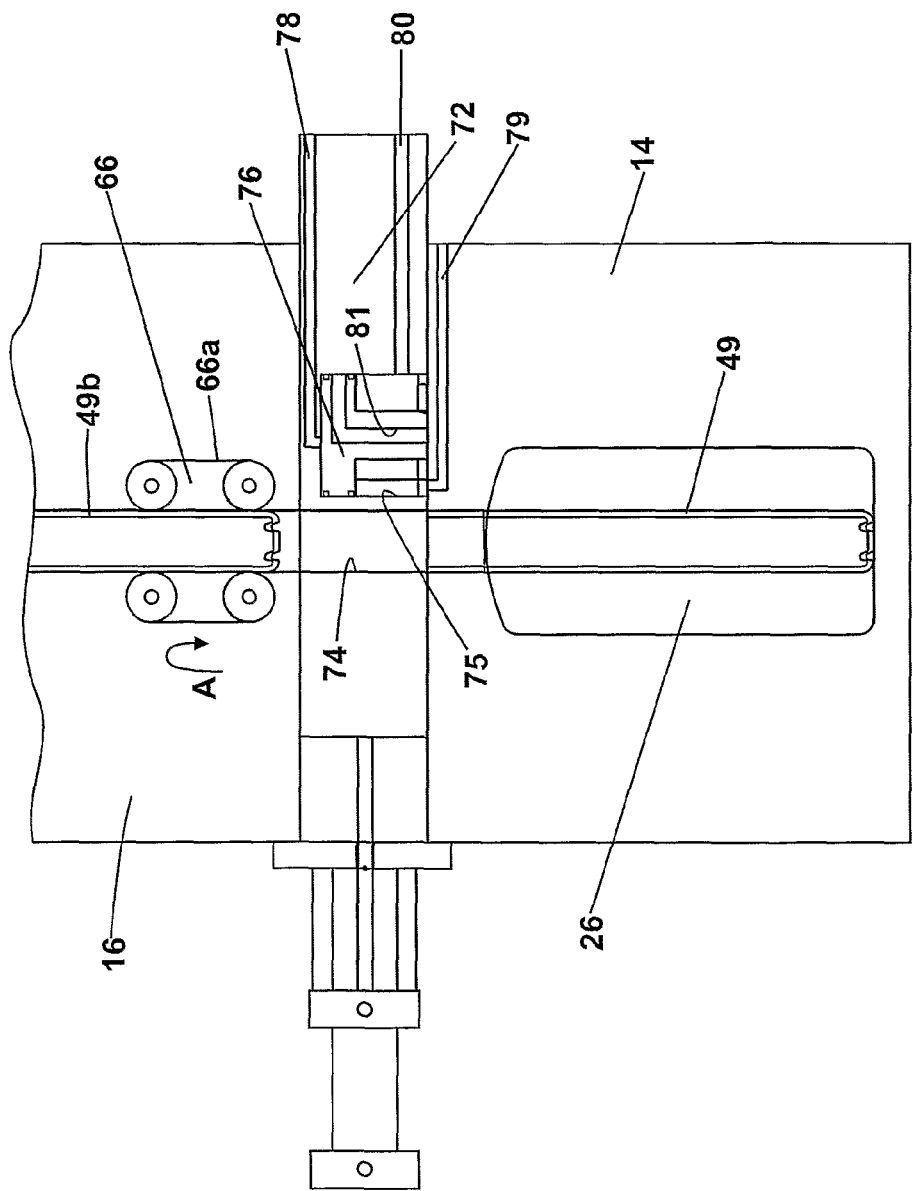
FIG. 3 is an enlarged view of a lower part of the apparatus of FIG. 1 including a blow pin slide unit.

Referring initially to FIGS. 1 to 3, there is shown a first embodiment of a stacked moulding apparatus 10 suitable for use in producing at least part of a manually actuated pump dispenser in accordance with the present invention. The apparatus comprises three process stations, an injection moulding station 12, a blow moulding station 14 and a stabilizing station 16 intermediate between the injection and blow moulding stations. All three stations 12, 14, 16 are located vertically one above the other and interconnected by a shaft or passageway 18.

The apparatus 10 has a main body 20 which is formed by a pair of bolster plates 22 which contact one another to define the shaft, the various moulding cavities and other features, to be described in detail later. FIGS. 1 and 2 show an abutment face 24 of one on the bolster plates 22 which contacts a corresponding abutment face on the other bolster plate which is not shown. The other bolster plate will be in many respects a mirror image of the plate 22 shown in FIGS. 1 and 2 in a manner well known in the art.

In the moulding apparatus 10, the bolster plates 22 are made of a metal such as steel or aluminum but they can be made of any suitable material or combination of materials. In a manner well known in the art, inserts may be used to define some or all of the features of the plates. This arrangement allows the apparatus to be modified by replacing or modifying the inserts without having to replace or modify the whole of the plates.

The abutment faces 24 of the bolster plates 22 have recesses which, when the plates are in contact, form a blow moulding cavity 26 and the shaft 18 which extends upwardly from the blow moulding cavity 26 to the upper surface 30 of the main body. Over the majority of its length the shaft is circular and has a diameter which is the same as, or slightly larger than, that of the preform to be produced in the injection moulding station. The blow mould cavity may be considered as an extension of the shaft. A core pin 32 locates in the shaft 18 and is mounted to a rod 34 which projects upwardly through the open upper end of the shaft 18. The rod 34 is supported at an upper region by means of a bearing 36 in a plate 38. The plate 38 is spaced from the upper surface 30 of the main body and is itself supported by means of rods 40 which are attached to one of the bolster plates 22. The core pin 32 may be formed integrally with the rod 34 and may be the same diameter as the rod or it may have a larger maximum diameter.

A drive mechanism 42 is provided to enable the core pin 32 to be moved along the shaft 18 in a controlled manner. In the present embodiment, the drive mechanism comprises a ball screw. In this arrangement, an upper region of the rod 34 has an external screw thread 44 which engages in a recirculating ball nut 46. A servo motor 48 is mounted to the plate 38 and drives the recirculating ball nut so as to move the rod 34, and hence the core pin 32, up and down.

Operation of the servo motor is controlled by a control system, not shown. It will be appreciated that other drive mechanisms could be used to control movement of the core pin 32. For example the core pin 32 could be moved using a lead screw arrangement or any suitable form of linear actuator such as an electronic or fluid pressure actuator.

As noted above, the first process station 12 is an injection moulding station in which preforms 49 are moulded from one or more polymeric materials. A pair of closure members, otherwise known as trap doors, 50 are mounted by means of pivots 52 within an annular recessed region 53 of the shaft 18 at a lower end of the first station. Each of the doors 50 is operatively connected with a pneumatic actuator 54 which moves it from a closed position as shown in FIG. 1 to an open position as shown in FIG. 2 about the pivot 52. In the closed position, the doors 50 abut one another to close off an upper portion of the shaft 18 within the first station from the remainder of the shaft to define an injection moulding cavity in the upper portion. In the open position, the doors 50 are located within in the recessed portion 53 of the shaft 18 outside of the circumference of the main portion of the shaft, so that a preform moulded in the injection moulded cavity can be moved down past the doors into the shaft portion 18 within the third of the processing stations 16.

When a preform 49 is to be moulded in the first station, doors 50 are moved to the closed position with the core pin 32 positioned so that its lower end 32a is located within the shaft 18 above the doors. Thus a preform injection moulding cavity is defined between the wall of the shaft 18 and the side of the core pin 32 and between the lower free end 32a of the core pin 32 and the opposing upper surfaces 56 of the closed trap doors 50. Polymeric material can then be injected into the space between the core pin 32 and the shaft 18 and between the core pin and the doors 50 to form a generally cylindrical preform 49 with a closed end.

In the present embodiment, the apparatus has an injection ring-gate, indicated schematically at 58, which is located at the upper end of the injection moulding cavity so that the material flows down through the cavity under pressure. The ring-gate comprises a circular recess which is equidistant from the mould cavity and is fed from one or more injection gates. The ring-gate is filled before the mould cavity and two or more feed channels (not shown) direct the material into the mould cavity. Preferably, the ring-gate is positioned above the mould cavity so that the material flows evenly through the feed channels into the mould cavity.

To prevent the core pin 32 from moving to one side or the other whilst the material is being injected, the core pin 32 is brought into contact with the closed doors 50 during the initial stages of injection. Once the side wall of the injection moulding cavity is full, or at least substantially full, the core pin 32 is raised slightly away from the closed doors 50 so that polymeric material can flow into the gap between the free end 32a of the pin and the doors 50 to form a base or closed end of the preform. The free end 32a of the core pin 32 and the opposing surfaces 56 of the doors 50 are shaped so as to have corresponding inter-engaging surface features which help in holding the core pin 32 substantially centrally within the injection moulding cavity. Alternative locking member arrangements can be used to hold the core pin 32 centrally within the preform moulding cavity. For example a retractable locking member may be provided which can be brought into contact with the core pin 32 during the initial stages of injection moulding and later retracted so the gap left by the pin is filed with polymeric material. The locking member may be a locking pin. Where an alternative means of locking the core pin is used or in applications where lateral movement of the core pin 32 whilst material is being injected is not problematic, the core pin 32 may be spaced from the trap doors 50 even during the initial stages of injection moulding.

Once injection moulding of a preform 49 is complete, the actuators 54 move the trap doors 50 to the open position so that the preform can be moved down along the shaft into the intermediate station 16. During the injection moulding process, excess polymeric material will be built up in the ring-gate and feed channels which must be removed before the preform 49 can be transferred into the intermediate station. To remove this excess material, the apparatus has a cutter or guillotine 60 which is slidably located at the upper end of the injection moulding cavity. As can be seen best in FIG. 2, the cutter comprises a plate 61 having a hole 62. The plate 61 is movable by means of a pneumatic or other actuator 63 from an injection position as shown in FIG. 1, in which the hole 62 is aligned with the shaft 18, to a disposal position in which the hole 62 lies above a downwardly sloping bore 64 in the main body. When the cutter plate 61 is in the injection position, the core pin 32 and/or the rod 34 is/are able to pass through the hole 62 to enter the injection moulding cavity and beyond. Once the injection-process has been completed, the preform is allowed to cool for a period, after which the core pin 32 is retracted above the cutter plate 61. The cutter plate 61 can then be moved to the position shown in FIG. 2, removing the excess material or sprue, carrying it until it falls into the sloping bore 64 for collection and recycling or disposal. The cutter 61 is then returned to the injection position and the core pin 32 lowered to re-engage in the preform and push the preform down into the intermediate station 16 through the opened trap doors 50.

Alternative arrangements can be made for removing the excess polymeric material. For example, in certain applications is may be desirable not to have to withdraw the core pin 32 from the preform before it is moved into the intermediate processing station 16. In this case the excess material can be removed by using a pair of cutting plates each having a semi circular opening with a cutting edge which locates about the core pin 32. The plates would be movable so that the cutting edge is brought into contact with, or very close to, the surface of the core pin to cut the excess material from the preform. A suitable mechanism can be provided to remove the excess material after cutting. This may be mechanical or the material could be removed using suction or blowing.

The core pin 32 lowers the preform 49 until it is located in position within the intermediate processing section 16 as indicated at 49b. A pair of drive tractors 66 is located at a lower end of the intermediate section 16. The drive tractors each have a flexible drive belt 66a which is arranged to lightly contact the outer surface of the preform to hold it in position. Each tractor has a drive mechanism which can be actuated by the control system to rotate the belt in the direction of arrow A to move a preform 49b from the intermediate station into the, blow moulding station 14 as will be described in more detail later.

Once the core pin 32 has moved a preform 49 into position 49b within the intermediate processing station, it is retracted back into the injection moulding cavity so that another preform can be moulded. To ensure that the preform stays in the intermediate station 16, the apparatus has a pair of retractable preform stripper plates 68 which are moved by means of actuators 70 (shown only in FIG. 2) into contact with the core pin 32 above the preform 49b before the core pin 32 is retracted. This prevents the preform 49b from being carried back into the injection moulding cavity with the core pin 32. The stripper plates 68 can be retracted so as not to obstruct the shaft 18 whenever a preform is to be moved from the injection moulding station into the intermediate station.

In the present embodiment, the intermediate station is a stabilisation or cooling station in which a preform is held prior to entering the blow moulding station. There is often a temperature gradient between the inner and outer surfaces of a preform after injection moulding. It has been found that it is beneficial to allow the temperature of the material in the preform to normalize throughout before it is blown. It is also often desirable for the temperature of the preform to be reduced from that immediately after injection moulding before the preform is blown. Generally speaking, the thicker the wall sections of the preform, the longer it takes to normalise to within acceptable limits. Cooling times will also usually be longer than for an equivalent preform made of the same material but with thinner wall sections.

The lower station 14 is the blow moulding station in which corresponding recesses in the bolster plates 22 define a blow mould cavity 26. Between the blow moulding station 14 and the intermediate station 16 there is blow pin slide unit 72 Which acts as a second closure arrangement for closing off the blow mould cavity from the rest of the shaft 18 when a preform is to be blown. The unit 72 comprises a body portion connected with a pneumatic or other actuator 73 which moves the unit between a transfer position shown in FIG. 1 and a blow moulding position shown in FIG. 2. The body portion includes a through bore 74 which is substantially the same diameter as the shaft 18 and aligns with the shaft when the body portion is in the transfer position. In this position, the tractor units 66 can drive a preform 49b in the intermediate station through the bore 74 into the blow mould cavity 26.

The body portion of the blow pin slide unit 72 also has a circular recess 75 open at a lower face of the body. The recess 75 is offset laterally from the bore 74 and houses a blow pin piston 76. The piston sealingly engages with the side wall of the recess and carries a smaller diameter blow pin portion 77 which projects downwardly from the piston 76. The piston 76 is movable up and down within the recess to move the blow pin portion 77 between an upper retracted position as shown and a lower, extended position in which the blow pin engages in the neck region of a preform in the blow mould cavity, when the unit 72 is in the blow moulding position. A pair of ducts 78, 79 are in communication with the recess 75 above and below the piston 76 respectively and are alternately connected to a source of pressurised fluid (such as air) and an exhaust to move the piston between the retracted and extended positions. A first of the ducts 78 which communicates with the recess above the piston is formed in the body of the blow pin slide unit 72. The second duct 79, which communicates with the recess below the piston, is formed in one or both of the bolster plates 22.

A third duct 80 extends through the body of the blow pin slide unit and aligns with a further duct 81 in the blow pin piston when the piston 76 is in the extended position. The third duct 80 is connectable with a source of pressurised fluid, such as nitrogen or air, which is fed via the further duct 81 into the interior of the preform to expand the preform into the blow moulding cavity.

Alternative mechanisms for transporting a preform along the shaft 18 can be provided. For example, one or more retractable abutment or ledge member may be provided which can be extended into the shaft 18 for the preform to rest on. When the preform is to be moved into the blow moulding station 14, the ledge member is retracted so that the preform falls under the influence of gravity into the blow moulding cavity. The one or more retractable abutment or ledge member could be arranged to move longitudinally over part of the length of the shaft so as to guide a preform before being retracted into a groove or recess and returned to a start position. Rather than providing an additional abutment for holding the preform in the intermediate station 16, the preform 49b could be arranged to rest on an upper surface of the blow pin slide unit 72 when it is in the blow moulding position. When the unit 72 is moved to the transfer position, the preform would fall through the bore 74 into the blow mould cavity 26.

The overall operation of the apparatus 10 will now be described.

When the apparatus 10 is first started, there are no preforms in any of the processing stations and the apparatus 10 is configured to mould a first preform in the injection moulding station 12. Thus the trap doors 50 are closed and the core pin 32 is raised into the injection moulding cavity with the free end 32a in contact with the doors. A preform 49 is then moulded and the excess material in the ring-gate and feed channels is removed as described above. The trap doors 50 are opened, the stripper plates 68 retracted and the core pin 32 lowered to move the first preform 49 into the intermediate station 16. The stripper plates 68 are then extended and the core pin 32 retracted back up into the injection moulding cavity so that a second preform can be moulded whilst the first remains in the intermediate, stabilising station 16.

When the second preform has been moulded and the first has stabilised sufficiently for it to be blown, the first preform is moved into the blow moulding cavity by the drive tractors 66 through the bore 74 in the blow pin unit 72 which is in the transfer position. The second preform is moved in to the intermediate station 16 and the core pin 32 is retracted into the injection moulding cavity so that a further preform 49 can be moulded.

Whilst the further preform is being moulded, the first preform is blown in the blow moulding cavity 26. To this end, the blow pin unit 72 is moved to the blow moulding position and pressurised air is introduced through the first duct 78 above the piston 76 to the extended position so that the blow pin portion 77 engages with the neck region of the first preform.

Pressurised fluid is then introduced into the interior of the preform through the duct 80 and the further duct 81. Once the first preform has been fully expanded, connecting the second duct 79 to a source of pressurised fluid and the first 78 to an exhaust or other lower pressure environment retracts the blow pin piston 76 to remove the blow pin from the neck of the now blow moulded component. At this stage or later, the blow pin slide unit 72 can be moved back to the transfer position. In order to remove the blow moulded component from the blow moulding cavity 26, the bolster plates 22 are briefly separated and the component ejected downwardly using an ejection pin, not shown, or some other suitable mechanism. The bolster plates 22 will usually be separated after a preform has been moulded in the injection moulding station. The bolster plates 22 are then brought back into contact and the process repeated with the second preform being moved into the blow moulding station, the third preform being moved into the intermediate station so that a further preform can be moulded in the injection moulding station. Once all the stations are loaded, the process continues in a cycle.

Whilst the bolster plates 22 are separated, the preforms in the injection moulding station 12 and the intermediate station 16 are exposed to the air. However, the plates are separated and rejoined very quickly so that the temperature of the preforms is adequately regulated. If necessary, the apparatus 10 can be modified so that rather than the whole of the bolster plates 22 being separated, only the part of the plates which form blow moulding cavity are separated to allow the blown article to be ejected. Other arrangements for ejecting the blown component through the base of the apparatus without fully separating the bolster plates 22 can also be adopted in a manner known in the art.

It will be appreciated that the precise sequence in which the various components of apparatus 10 are moved can be varied from that described above as will be readily apparent to someone of ordinary skill in the art.

As previously mentioned, FIGS. 1 and 2 show only one bolster plate 22. All the additional equipment shown in the these drawings, such as the guillotine 62, the trap doors 50, the drive tractors 66, the bow pin slide unit 72 and their actuators, are typically mounted to one of the bolster plates as shown. The other bolster plate is essentially a mirror copy of the plate 22 shown but will have suitable recesses into which the additional equipment can be accommodated to enable it to mate with the bolster plate 22 with their abutment faces in contact.

Once the moulding apparatus 10 is running fully, the process time for each component produced is determined by the slowest cycle time of the three stations. For example, in a typical application the overall process time for a preform to be injection moulded, stabilised and then blown using conventional apparatus may be of the order of 30 seconds, of which 23 seconds may be the time required for the preform to stabilise. In the apparatus 10, the process time per unit produced once it is in full operation will be around 23 seconds, this being dictated by the time the preform is held in the intermediate station 16 for stabilisation. Providing two or more intermediate stations between the injection moulding station and the blow moulding station could reduce the process time per unit further. In this way the stabilisation period can be divided between two or more intermediate stations. Thus, in the above example, with two intermediate stations it may be possible to produce a blow moulded component every 11.5 seconds, provided the processing times required for the injection moulding and blow moulding stages are equal to or less than this. In an optimised system, the cycle time is reduced to a minimum, which may be determined by the process time required in the slowest of the injection or blow moulding stages.

It is a further advantage of the apparatus 10 that the stations are located one above the other so as to occupy a minimum horizontal cross sectional area. With this arrangement, the number of moulds that can be incorporated in a given area is maximised. In practice, it is expected that a single moulding tool will compromise a number of moulding apparatuses or impressions 10 as described above. The actuator arrangements 54, 63 70, 73 for the various moving parts such as the trapdoors 50, the guillotine 62, the preform stripper plates, and the blow pin slide unit 72 can be arranged so as to extend substantially vertically to reduce the horizontal footprint of the apparatus and so increase the number of impressions that than can incorporated into a single moulding tool. In certain applications, a common actuator may be arranged so as to move components on two or more adjacent apparatuses 10.

Where the time required for stabilisation is a relatively small part of the overall cycle time, the intermediate station could be omitted and the apparatus 10 would have only two stations, the injection moulding station 12 and the blow moulding station 14. In this arrangement, the preform 49 can be moved from the injection moulding cavity into the blow moulding cavity by the core pin 32 and a single closure provided between the two stations. For example, a modified sliding blow pin unit 72 could be adapted to perform the functions of both the first closure arrangement for closing off the injection moulding cavity as well as the second closure arrangement for closing off the blow moulding cavity.

The apparatus 10 described above can be modified in a wide variety of ways to mould many different types of components from simple bottles and containers to very complex components. For, example, the apparatus 10 can be adapted to carry out the known process of stretch blow moulding. Stretching of the preform 49 can be carried out either in one of the intermediate stations or within the blow mould cavity. In a two station apparatus, the preform can be stretched in the blow mould cavity using the core pin 32. Where the apparatus has one or more intermediate stations, a further retractable pin is provided at the blow moulding station 14 to stretch the preform. This may require the blow moulding cavity 26 to be offset laterally from the preform moulding cavity to provide room above the blow moulding cavity into which the stretching pin can be retracted out of the blow moulded component. This will require a mechanism in the shaft 18 to move the preform laterally to position it above the blow moulding cavity. This may comprise a ram mechanism for example. The pin used to stretch the preform may by a blow pin having one or more ducts through which pressurised fluid can be introduced into the preform. This could comprise a modified form of the blow pin piston 76 and blow pin 77 as described above, for example. Since the blow moulded article will usually be wider than the preform, it is expected that the blow mould cavity can be offset without increasing the overall width of the apparatus.

In a further alternative arrangement, the preform could be stretched using fluid pressure rather than a pin. In one arrangement, the blow moulding station includes a tube member which can be extended to surround the preform within the blow mould cavity to restrict its outward extension when pressurised fluid is introduced into the preform so that the preform is constrained to expand predominantly lengthways until it is the desired length. At this time the tube can be retracted to enable the preform to expand outwardly into the expansion mould cavity. The tube member would preferable be retracted downwardly out of the base of the blow mould station.

The apparatus 10 can also be modified to carry out bi-injection type moulding type processes, in which a further polymeric material is over moulded on to a first polymeric material moulded in a previous stage. The first and further polymeric materials may be the same or different materials. The over moulding material could be of a different colour to the first material, for example. Bi-injection moulding can be carried out in the preform moulding station 12, in the blow moulding station 14, and/or in one or more intermediate processing stations 16. For example, when moulding a bottle or other container which has a cap or lid, the cap can be moulded onto the neck of the preform whilst it is in the blow moulding cavity. Thus a mould for the cap can be incorporated into the bolster plates 22 or the blow pin unit 72 and means provided to introduce a molten polymeric material into the mould. Moulding of the cap is advantageously carried out whilst the preform 49c is being blown but it could be carried out either before or after. Other features can be moulded onto the neck of a preform in a similar way or a second material may be over moulded on cap or inside the preform.

In a further modification, grooves may be provided in the surface of the core 32 to forms ribs on the inner surface of the preform tube to enable the walls of the preform tube to be made thinner. Where the preform is stretched, the ribs will become thinner enabling them to be removed from the grooves in the core more easily.

For certain applications it is desirable to produce a laminated preform comprising multiple layers of the same or different materials. This arrangement is used to overcome problems caused, for example, by the permeability of the material used to form bottles or other containers. A particular example of this is bottles for carbonated drinks where the gas eventually diffuses through the material of the bottle. This problem has been resolved in the prior art by use of a barrier lining created by co-extruding two or more plastics as a tube. One end of the tube is cut in such a way as to join the two plastics to each other to make a preform in which one of the plastics forms a barrier lining to reduce permeability of the bottle.

The preform injection moulding station 12 can be adapted in many ways to mould preforms having multiple layers, internal walls and numerous other features. In particular, the preform moulding station 12 can be adapted to mould a preform in accordance with any of the arrangements disclosed in the applicants' co-pending International patent application No. PCT/GB2006/002751. Thus, the preform moulding station 12 may comprise one or more movable mould members which can be extended into spaced relation to the core pin 32 or other of the movable mould members in a desired orientation to define an injection moulding cavity into which a polymeric material can be injected to form a first layer of the preform, the one or more mould members being retracted or moved to a further orientation to define at least one further injection mould cavity into which a further polymeric material can be injected to form a further layer of the preform.

Figure 4:
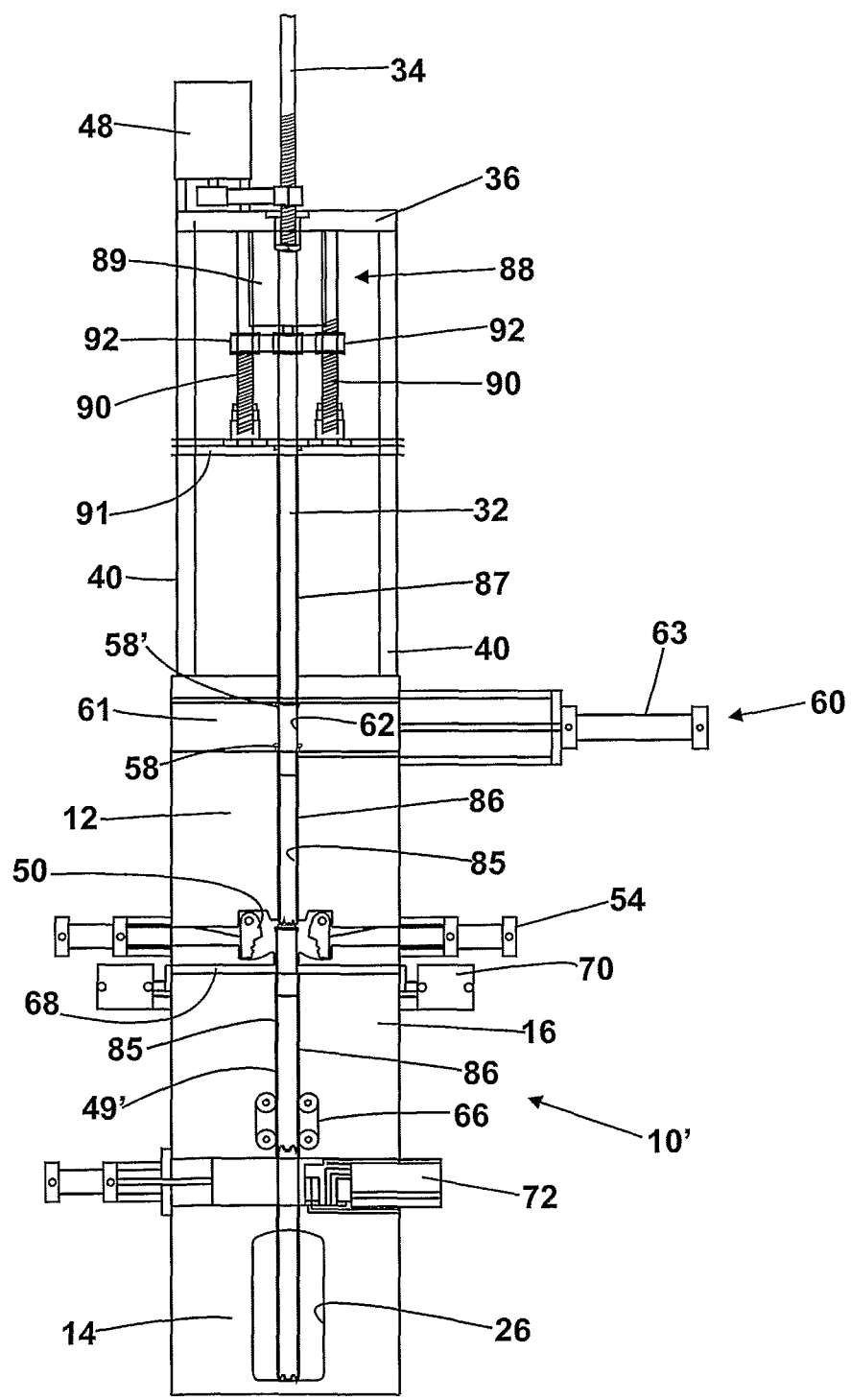
FIG. 4 is a view similar to that of FIG. 2 but showing an alternative embodiment of a moulding apparatus suitable for producing at least part of a dispenser in accordance with the invention.

FIG. 4 shows an exemplary embodiment of the apparatus 10' which is adapted to produce a preform 49' having two layers of polymeric material, an inner layer 85 and an outer layer 86.

The modified apparatus has a tubular mould member or sleeve 87 which locates about the core pin 32. An upper end of the sleeve is supported by a mechanism, indicated generally at 88 for moving the sleeve up and down within the shaft 18. The mechanism 88 includes a servo motor 89 which is mounted to the upper plate 38 or some other fixed component. Two lead screws 90 are mounted to an upper surface of a further plate 91 to which the upper end of the sleeve 87 is attached. The motor 89 drives the lead screws 90 via a pair of recirculating ball nuts 92 to move the further plate 91 and hence the sleeve 87 up and down under the control of the control system. The further plate 91 may have holes through which the rods 40 pass to guide its movement. The outer diameter of the sleeve 87 is spaced from the inner surface of the shaft 18 by the desired thickness of the outer layer 86, whilst the outer surface of the core pin 32 is a snug sliding fit within the sleeve.

The preform moulding station 12 has two injection gates, a first lower gate 58 through which a first material is introduced to form the outer layer 86 of the preform 49' and a second gate 58' higher than the first through which a second polymeric material can be introduced to form the inner layer 85 of the preform. The cutter 60 has a cutter plate 61 of increased thickness, which is arranged to remove the excess material or sprue from both gates after a preform has been injected.

Operation of the modified embodiment of the apparatus 10' will now be described.

With the trap doors 50 closed, the core pin 32 and the sleeve 87 are both positioned within the injection moulding cavity above the closed trap doors 50. In a preferred arrangement, one or both of the sleeve 87 and the core pin 32 will initially engage the trap doors 50 so as to be locked in position to reduce the tendency for them to be moved laterally as material is injected. With the components in the orientation described, an annular cavity is defined between the wall of the shaft 18 and the outer surface of the sleeve 87 into which a first material is injected to form a sidewall region of the outer layer 86 of the preform 49'. Once the sidewall region is full, or substantially so, the core pin 32 and the sleeve 87 are moved upwardly to a position in which they are spaced from the closed trap doors so that the first polymeric material can flow between the trap doors 50 and the free ends of the core pin 32 and the sleeve 87 to form a base region of the outer layer 86 of the preform.

In an alternative arrangement, the trap doors 50 can be arranged to move downwardly away from the ends of the sleeve 87 and core pin 32 to form the base. In a further alternative, the sleeve 87 may be spaced from the trap doors by the desired thickness of the base region from the start with only the core pin 32 engaging the trap doors initially. Since the core pin 32 is a snug fit within the sleeve 87, engagement between the pin 32 and the trap doors 50 will lock both the core pin 32 and the sleeve 87 in position. It will also be appreciated that where an alternative arrangement for locking the core pin 32 and/or the sleeve 87 is provided or where lateral movement of the pin 32 and the sleeve 87 is not an issue, both the sleeve 87 and the core pin 32 may be spaced from the trap doors at the start of the injection moulding process.

Once the first outer layer 86 as been formed, the sleeve 87 is moved upwardly out of the injection moulding cavity above the upper injection gate 58'. This leaves an annular cavity between the outer surface of the core pin 32 and the outer layer 86 into which a second material can be injected through the upper injection gate 58' to form the inner layer or lining 85. Initially, whilst the second material is injected to form the sidewall region of the inner layer 85, the core pin 32 remains in contact with the base region of the outer layer to hold it steady. Once the side wall region of the inner layer is full, or substantially full, the core pin 32 is retracted upwardly so that it is spaced from the base region of the outer layer to allow the second polymeric material to flow into the gap created to form the base region of the inner layer 85.

After the inner layer 85 has been injected, the preform 49' is allowed to cool. The core pin 32 is then retracted above the cutter plate 61 which is moved across by the actuator 63 to remove the excess material or sprue from both gates 58, 58', in a manner similar to that described above in relation to the first embodiment. Although not shown in FIG. 4, the apparatus 10' may have an angled shaft similar to the shaft 64 in the first embodiment through which the excess material falls. Once cutter plate 61 has been moved back to align the hole 62 with the shaft 18, the core pin 32 is moved back down into preform 49', the trap doors 50 are opened and the core pin 32 pushes the preform though into the further processing station 16. The apparatus is then operated in a manner similar to that described above in relation to the first embodiment. In the blow moulding station, both layers may be fully expanded or, as will be discussed in more detail below, the inner layer may only be partially expanded or indeed not expanded at all.

As described above the modified moulding apparatus 10' produces a preform having two layers 85, 86 formed one on cap of the other. Those skilled in the art will readily appreciate that by using two or more sleeves 87, it would be possible to produce a preform have three, four, five six or more layers. It will also be recognised that the apparatus 10' could be arranged by use of an additional sleeve to produce a preform in which a gap is created between the sidewall regions of any two adjacent layers but where the base regions touch. The laminated preform 49' may be stretched prior to or during the blow moulding phase in a manner similar to that described above in relation to the previous embodiments.

There will now follow a description of several embodiments of a manually actuated pump dispenser in accordance with the invention. The same reference numerals will be used to designate features which are the same or which serve similar functions in each of the embodiments.

Relative terms such as upper, upwardly, top, lower, and bottom and the like as used in the description and claims relate to the dispenser, and its various parts, when the dispenser is positioned upright as shown in the accompanying drawings. It will be appreciated that the dispenser may be held in other orientations and such terms should be construed accordingly.

FIGS. 5 to 11 show a first embodiment of a manually actuated pump dispenser 110 in accordance with the invention. The dispenser 110 comprises three component parts, a container 112, an actuating cap 114 and a resiliently flexible insert 116.

The container has a main body 118 for receiving a fluid to be dispensed and an open neck region 120 which forms a first or base part of the dispenser pump. The cap 114 is mounted to the neck region 120 and forms a second or upper part of the dispenser pump. The flexible insert 116 is mounted between the cap 114 and the neck region 120 to define a main pump chamber 122 and, in this embodiment, a secondary pump chamber 123.

The container 112 and cap 114 are preferably formed from a polymeric material such as polyethylene, polythene or the like using injection and/or blow moulding techniques as will be discussed in more detail later. The flexible insert 116 may also be formed by injection moulding from a polymeric material. Typically, the insert 116 is made from a material which once moulded remains resiliently flexible such as TPV, TPE, PP, silicon or the like. However, the flexible insert could also be manufactured using bi-injection techniques so as to have a core or framework of a more rigid material onto which the flexible portions are over moulded. This would provide for additional strength. The cap 114 and at least the neck 120 of the container are typically formed from a material which is substantially rigid once moulded, or at least substantially rigid when compared with the flexible insert. The main body 118 of the container may also be substantially rigid after moulding or it may be flexible.

The neck region 120 of the container 112 is substantially annular in shape and has a ridge 124 extending around its outer surface and which separates an upper portion 120a of the neck from a lower portion 120b. The upper portion 120a has a slightly smaller outer diameter than the lower portion 120b. Two diametrically opposed grooves 126, only one of which can be seen, extend longitudinally through the ridge 124 and into the lower portion 120b. Two pairs of stops 128, 130 project radially outwardly from the outer surface of the upper region 120a adjacent the ridge 124. A first pair of stops 128 are positioned adjacent each of the grooves 126, whilst the other pair of stops 130 are aligned at approximately 90 degrees to the first pair.

The upper edge of the neck 120 has flange 132 which angles inwardly to support the flexible insert 116 as will be described in more detail below. A small opening 134 extends through the wall of the neck to provide an air inlet to the container as will also be described in more detail below.

The cap 114 has an annular main body portion 136 which is received over the neck region 120 of the container. An inwardly directed flange 138 is formed at the lower edge of the main body for cooperation with the ridge 124 on the neck of the container to prevent the cap 114 from being accidentally removed from the neck 120 after fitting. The arrangement is such that the cap 114 can be pushed onto the neck 120 so that the flange 138 passes over the ridge 124 to engage with the lower surface of the ridge. In normal use, upward movement of the cap 114 relative to the neck 120 is limited by contact between the flange 138 and the ridge 124 to an upper rest position as shown in FIG. 1.

A pair of diametrically opposed, longitudinal locking tabs 140 project radially inwardly from the inner surface of the main body portion 136 of the cap. A lower edge 142 of the tabs 140 is arranged to be positioned just above the upper surface of the annular ridge 124 on the neck 120 when the cap 114 is in its upper rest position as shown in FIG. 1. In this position, the cap 114 can be twisted between a locked position in which the tabs 140 abut the second pair of stops 130 on the neck and an unlocked position in which the tabs 140 abut the first pair of stops 128. When the cap 114 is in the locked position, it is prevented from being depressed as the tabs 140 contact the upper surface of the ridge 124 on the neck. However, when the cap 114 is in the unlocked position the tabs 140 are aligned with the grooves 126 and the cap 114 can be depressed to the position shown in FIG. 2, with the tabs 140 entering and sliding along the grooves 126. This provides a simple twist locking mechanism that enables a user to lock the dispenser 10 against accidental actuation. Any other suitable means of locking the cap against accidental actuation can be used.

Figure 5:
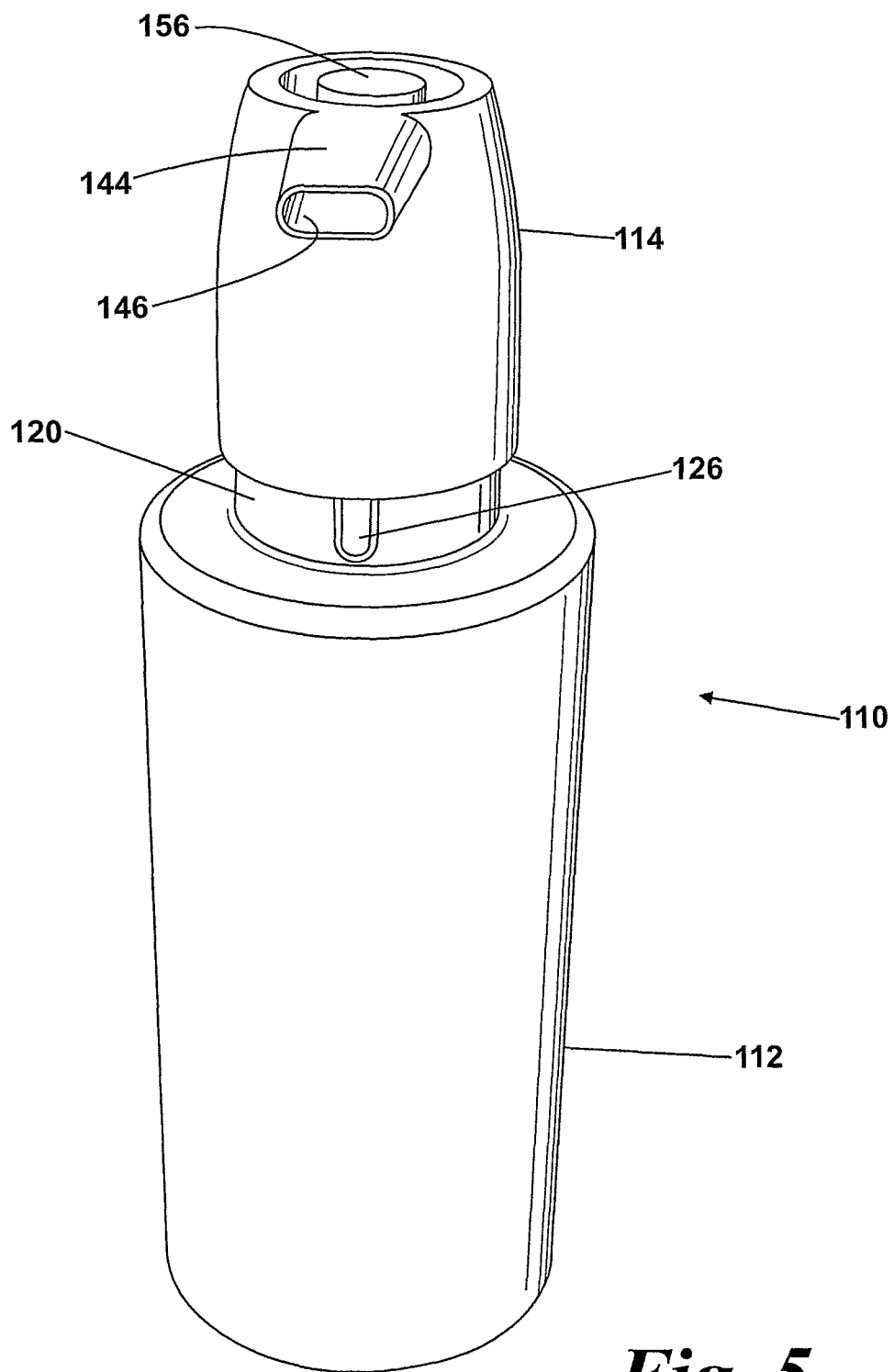
FIG. 5 is a perspective view of first embodiment of a dispenser in accordance with the invention, shown prior to actuation.
Figure 6:
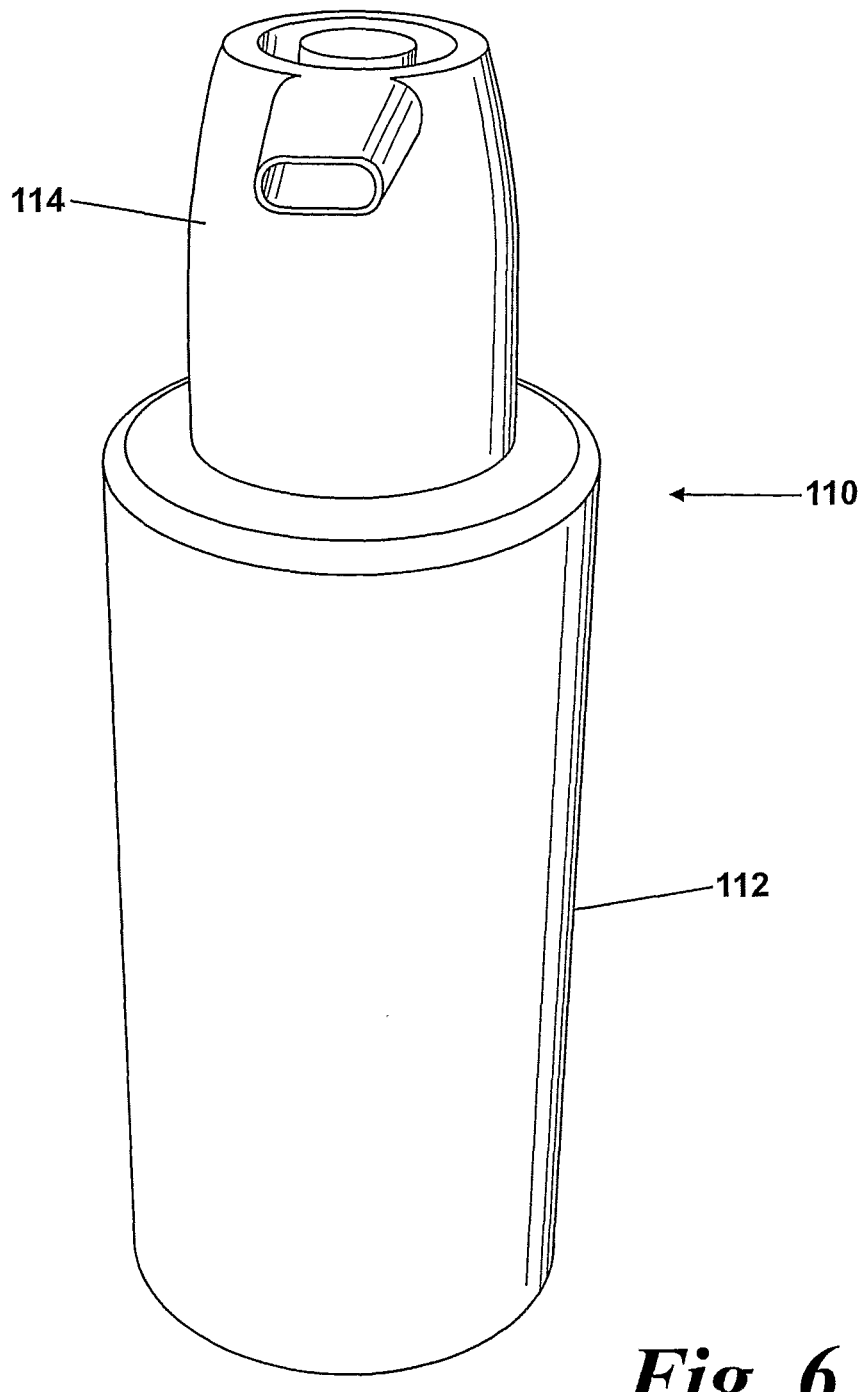
FIG. 6 is a view similar to that of FIG. 5 but showing the dispenser in mid-actuation with a cap portion depressed.
Figure 7:
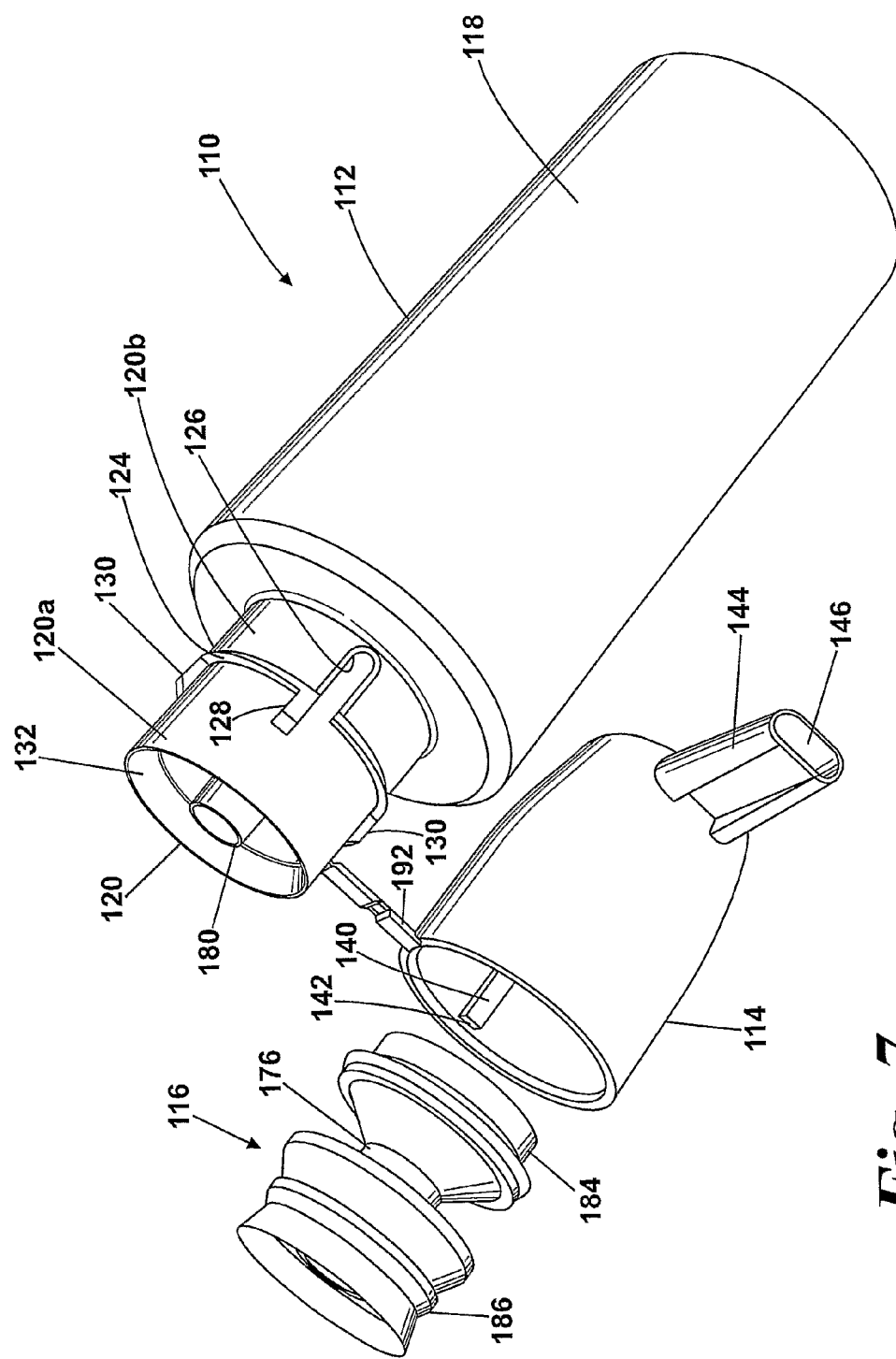
FIG. 7 is an exploded view of the dispenser of FIG. 5.
Figure 8:
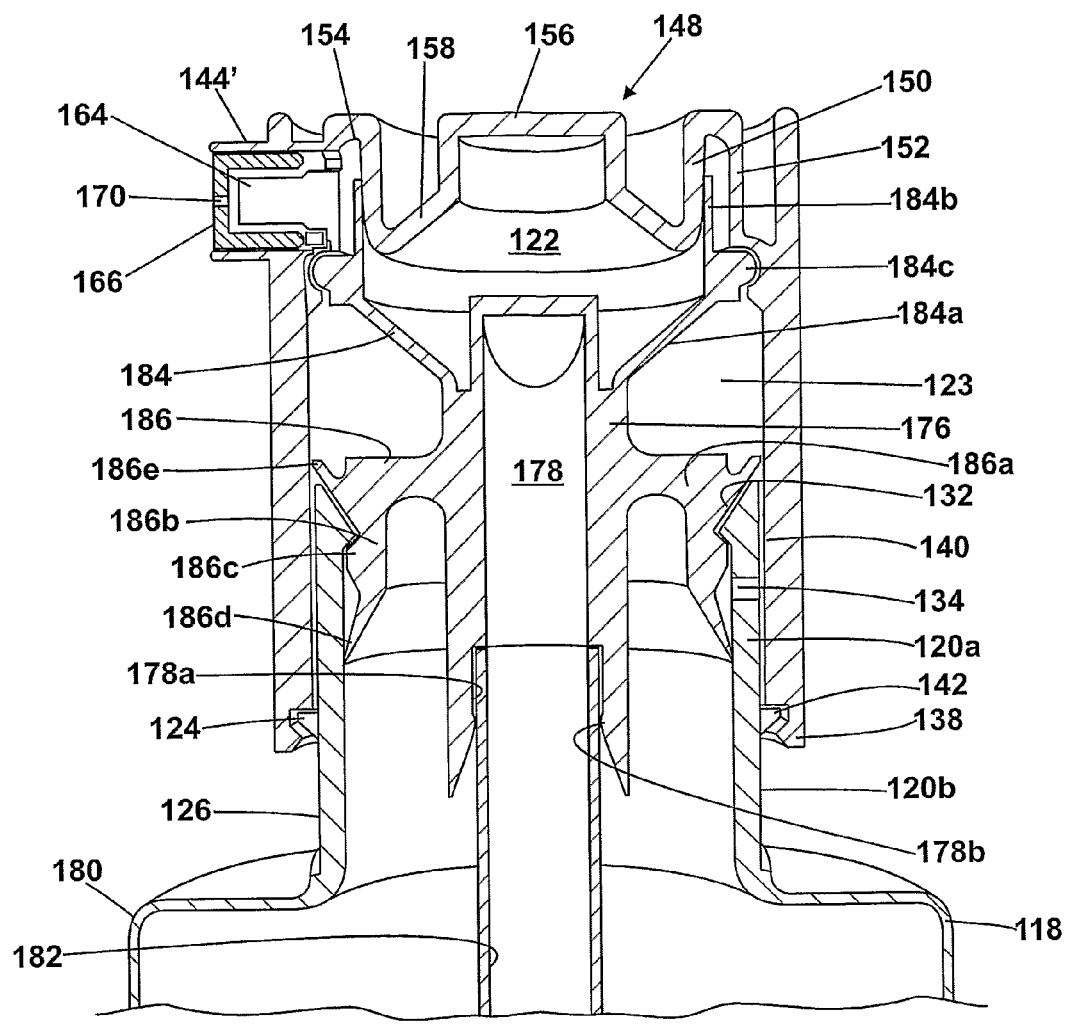
FIG. 8 is a cross-sectional view through part of the dispenser of FIG. 5 but showing an alternative outlet incorporating a spray nozzle.

An outlet 144 is formed at an upper region of the cap 114. In FIGS. 5 to 7, the outlet is in the form of an elongate spout having an oval cross section shape with a large internal outlet passage 146 suitable for dispensing a paste, gel or foam. In contrast, the outlet 144' shown in FIGS. 8 to 11 incorporates an atomizing nozzle suitable for dispensing a liquid as an atomised spray. It will be appreciated by those skilled in the art that the outlet 144 can be modified in numerous ways depending on the application and the type fluid to be dispensed. For example, in the present embodiments the outlet 144 is directed generally perpendicular to the longitudinal axis of the container 112 so as to extend horizontally when the dispenser is in an upright position. However, the outlet 144 could be arranged to extend parallel to the longitudinal axis of the container so as to project upwards when the dispenser is positioned upright or indeed at any desired angle.

Where the outlet 144' is in the form of a spray nozzle, a swirl chamber or other arrangement may be provided just prior to the final outlet orifice to encourage the liquid to spin about the axis of the orifice in a manner known in the art.

As can be seen best in FIGS. 8 to 11, the upper surface of the cap 114 includes an inwardly projecting collar 148. The collar 148 has first radially inner annular wall 150 which is connected at an outer or upper end to a second, radially outer annular wall 152 so as to provide an annular channel 154 between the two annular walls. The inner or lower end of the second annular wall is connected with the main body portion 136 whilst the inner or lower end of the inner annular wall 150 is connected to a central button 156 by means of a frusto-conical portion 158. A groove 160 is formed around the inner surface of the cap 114 at the junction between the outer annular wall 152 and the main body 136.

As mentioned previously, the outlet 144' as shown in FIGS. 8 to 11 comprises a nozzle configured to generate an atomised spray of liquid. The outlet 144' includes a short annular spout 162, a generally circular projection 164 located centrally within the spout and an end cap or spray insert 166 which locates within the spout about the projection. The insert 166 is a tight fit in the spout 162 but its inner surface is spaced from outer surface of the projection to form flow passages for the liquid. An end wall 168 of the insert has at least one small orifice or nozzle 170 through which the liquid is expelled to form an atomised spray. In an alternative arrangement which is not shown, the circular projection may be omitted and the outlet nozzle formed by means of an insert mounted to the spout or other opening in the cap.

In the present embodiment, the dispenser 100 has two pump chambers, a main pump chamber 122 for pumping a liquid from the container and a secondary chamber 123 for delivering pressurised air to the outlet nozzle to mix with the liquid. A first opening 172 fluidly connects the interior of the outlet spout 162 with the annular space 154 between the first and second annular walls 150, 152 which forms part of an outlet flow path for the liquid from the main pump chamber 122. A second opening 174 fluidly connects the interior of the outlet spout 162 with the secondary pump chamber 123 to enable air from the secondary pump chamber to enter the outlet and mix with the liquid. The end face 164a of the projection and/or the inner surface of the end wall 168 of the insert may be shaped so as to form a swirl chamber in which the liquid and air are directed so as to rotate about the axis of the outlet orifice 170 in a manner known in the art. The air and the liquid may be kept separate in the outlet prior to entering the swirl chamber. This could be achieved for example by forming grooves and/or recesses on the inner surface of the insert 166 and/or the outer surface of the projection 164' to form separate flow paths for the liquid and air.

Figure 9:
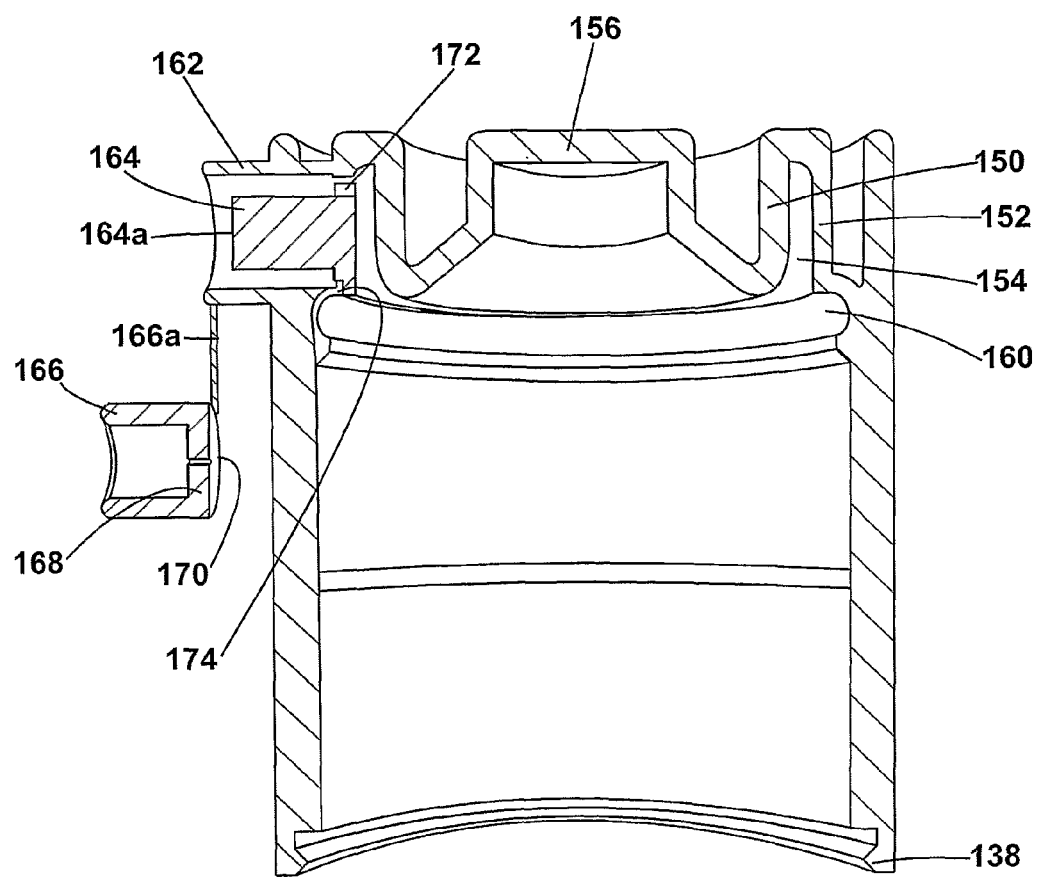
FIG. 9 is a cross-sectional view though a cap forming part of the dispenser of FIG. 8.

The spray insert 166 is preferable moulded in the same tool as the cap 114 and is connected with the cap by means of a flexible lanyard 166a as shown in FIG. 9. This arrangement assists in assembly of the dispenser as the cap 114 and insert 166 are held together to effectively form a single component part.

The flexible insert 116 has a central core 176 and a central bore 178 which extends longitudinally through the core. An inner or lower end of the bore 178 has a region of increased diameter 178a which is adapted sit on an upper end region of a dip tube 180. The dip tube 180 extends towards the bottom of the container 112 to enable the contents of the container to be dispensed in a known manner. A small ridge 178b is provided on the surface of the enlarged diameter portion 178a. The ridge 178b contacts the outer surface of the dip tube 180 to form a point contact seal similar to that of an O-ring.

In the present embodiment, the dip tube 180 is formed integrally with the container as will be described in more detail later. A lower end of the dip tube has an opening through which fluid can flow into a central bore 182. Although not shown in the drawings, the bottom of the container angles downwardly towards the centre of the container where the lower end of the dip tube is positioned. This arrangement ensures that substantially all the fluid in the container can be dispensed when the dispenser is positioned upright. Although it is preferred that the dip tube 180 is an integral part of the container it will be appreciated that the dip tube could be a separate component in the known manner.

The flexible insert 116 is shaped like a double bell. A first upper bell-like portion or diaphragm member 184 contacts the interior surface of the cap 114 to define the main pump chamber 122. A second lower bell-like portion or diaphragm member 186 extends outwardly from the main core to contact and seal with the neck region 120 of the container. The secondary pump chamber 123 is defined between the upper 184 and lower bells 186 within the cap 114.

The upper bell 184 includes a frusto-conical region 184a projecting upwardly and outwardly from the upper end of the core 176 towards the inner surface of the main body portion 136 of the cap and a tubular region 184b which extends from an upper end of the frusto-conical region to contact the outer surface of the inner annular wall 150 of the collar 148. A semi-circular seal 184c formed about the outer surface of the first bell at the junction between the frusto-conical region 184a and the tubular region 184b. The seal 184c engages and seals in the groove 160. The tubular region 184b is resiliently biased into engagement with the outer surface of the inner annular wall 150 to form a seal separating the main pump chamber 122 from the outlet 144. The tubular region 184b acts as a flexible valve member to control the release of liquid from the main chamber 122.

The flexible insert also forms a one-way inlet valve 185 for controlling the flow of liquid into the main pump chamber 122 from the dip tube. The valve 185 can be of any suitable form and could comprise a flap valve or a duckbill valve for example.

The lower bell 186 has a shoulder portion 186a which projects radially outwardly towards the neck 120 of the container 112 and a downwardly extending skirt 186b which extends into and seals with the inside of the neck region 120. A frusto-conical outer surface of the lower bell 186 rests on the flange 132 of the neck region whilst an angled projection 186c on the skirt engages in an undercut below the flange 132. This secures the flexible insert 116 to the neck region 120 of the container. A further frusto-conical extension 186d of the skirt engages with the inner surface of neck 120 to form a point seal. The extension, contacts the neck at a point below air inlet 134 and acts as a valve to admit air into the container. If the pressure in the container falls below atmospheric as the contents are used up, the extension 186d can be deflected away from the surface of the neck to allow atmospheric air to enter the container. At all other times, the extension 186d contacts the neck to form a seal preventing liquid from escaping through the air inlet 134 and the neck itself.

The lower bell has a further frusto-conical extension 186e which extends upwardly to contact and seal with the inner surface of the main body portion 136 of the cap 114 to define the secondary pump chamber 123 between the upper and lower bells 184, 186 and the cap 114. The further frusto-conical extension 186e is flexible and acts as a one way valve to admit atmospheric air into the secondary chamber after each actuation of the dispenser.

Figure 10:
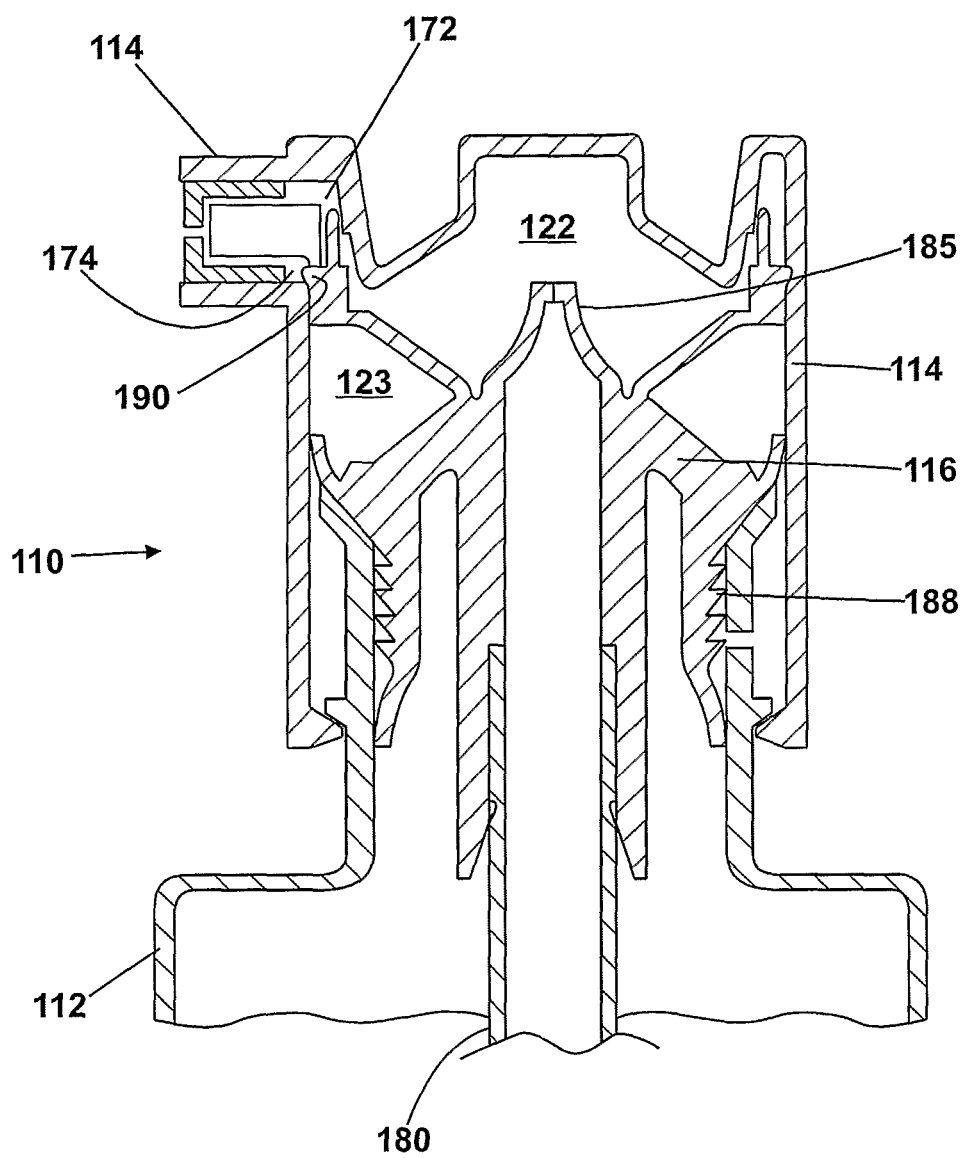
FIG. 10 is a cross-sectional view similar to that of FIG. 8 showing a modified form of the dispenser of FIG. 5 prior to actuation.
Figure 11:
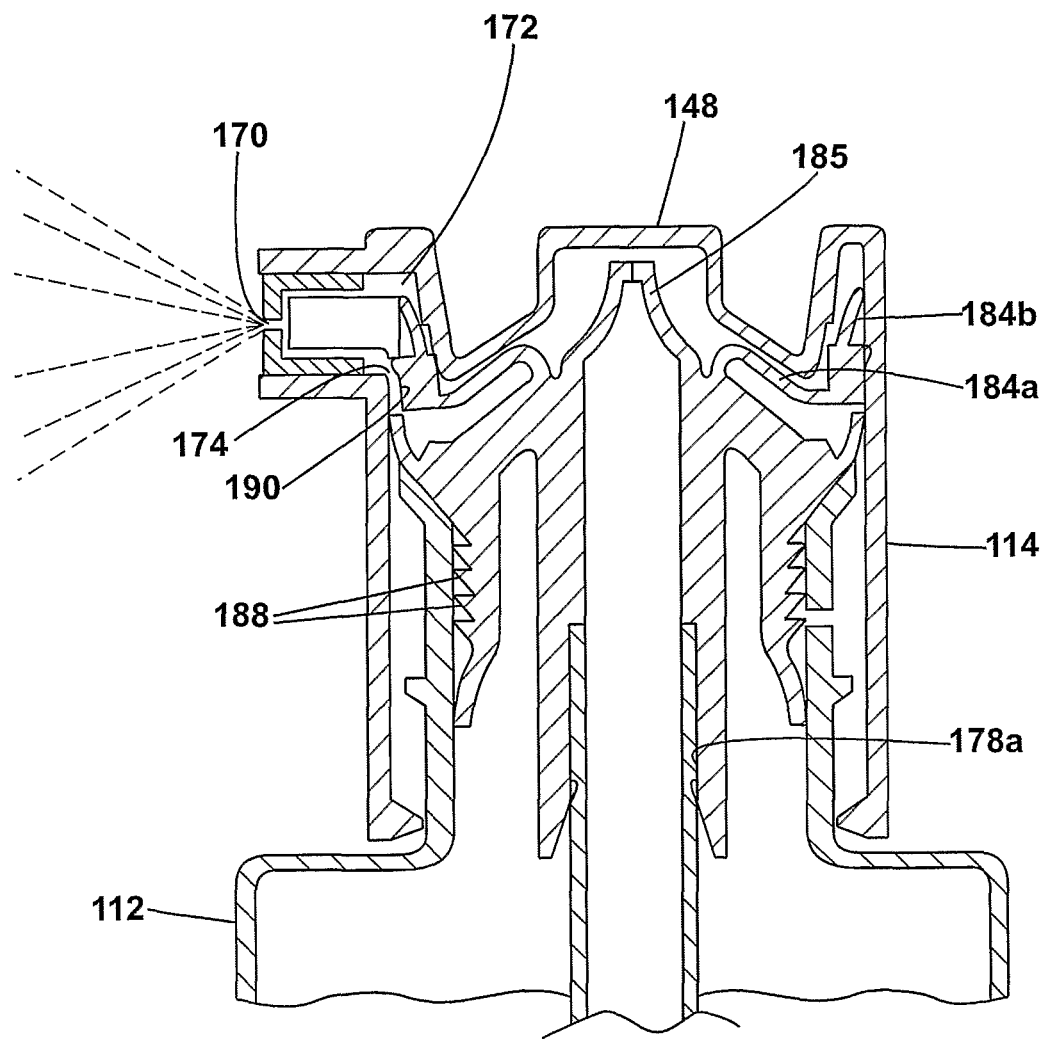
FIG. 11 is a view similar to that of FIG. 10 but showing the dispenser in mid-actuation.

Operation of the dispenser 110 will now be described with reference in particular to FIGS. 10 and 11. The dispenser as shown in FIGS. 10 and 11 has a modified flexible insert 116 in which the inlet valve 185 for the main pump chamber is in the form of a duck or fart type valve 185. This type of inlet valve 185 comprises a tube with a closed end having a slit 185a. When the pressure in the main pump chamber 122 falls as the flexible insert 116 recovers following each actuation, the slit 185a is opened to allow liquid to be drawn into the chamber. In a further modification, the flexible insert 116 is held in the neck region 120 of the container by a series of fins 188 instead of having a projection 186a which engages in an undercut. Eliminating the undercut in the neck 120 of the container makes it easier to mould. Other then these differences, the dispenser 110 shown in FIGS. 10 and 11 is constructed and operates in the same manner as the dispenser shown in FIGS. 5 to 9.

Assuming that the main pump chamber 122 and the secondary pump chamber 123 are fully primed with liquid and air respectively, the user initiates actuation of the dispenser by turning the cap to the unlocked position and depressing it. As the cap 114 is depressed, the conical region 184a of the upper bell 184 of the flexible insert is deflected the downwardly and the volumes of the main pump chamber 122 and the secondary pump chamber are reduced. This results in an increase in the pressure of the liquid, in the main pump chamber 122 arid the air in the secondary pump chamber 123. Since liquid is incompressible, there will only be small change in the volume of the main pump chamber 122 initially with the conical region 184a deflecting downwardly to reduce the volume of the secondary pump chamber 123.

The increasing pressure of the liquid in the main pump chamber 122 acts on the inlet valve 185 to ensure it remains closed and on the tubular region 184b of the upper bell 184. Once the pressure in the main chamber 122 has reached a predetermined level, the tubular region 184b is biased away from the inner annular wall 150 of the collar 148 so that the liquid flows under pressure into the annular channel 154 between the inner and outer annular walls 150, 152 of the collar and through the opening 172 into the outlet 144. The tubular region 184b thus acts as a pre-compression outlet valve ensuring that the liquid only flows from the main pump chamber 122 to the outlet 144 when it has reached a desired operating pressure suitable for producing a desired spray quality. The pressure at which the outlet pre-compression valve 184b opens is determined by the nature of the material used to form the flexible insert 116 and the thickness of the tubular region 184b. By selecting a suitable material and thickness, a designer can determine an appropriate opening pressure for the valve for any particular application.

At the same time, the increasing pressure of the air in the secondary chamber 123 acts on the further frusto-conical extension 186e of the lower bell pushing it firmly onto the wall of the main body portion 136 of cap 114 to form a tight seal. As shown in FIG. 10, the opening 174 connecting the secondary chamber 123 to the outlet 144 is normally closed by a portion of flexible insert 190 which acts as a pre-compression outlet valve member for the secondary pump chamber 123 in a manner similar to that of the tubular region 184b described above. Thus the portion of the flexible insert 190 closing the opening 174 is moved to admit air into the outlet 144 once the pressure of the air reaches a predetermined value. The outlet valves for the main and secondary chambers 122, 123 may be arranged to open at the same pre-determined pressure or at different pressures. For example, the air may be admitted into the outlet slightly earlier than the liquid.

Once the outlet valves for the pump chambers have opened, as shown in FIG. 11, the user continues to depress the cap 114 further reducing the volume of the chambers so that the liquid and air continue to flow through the outlet where they are mixed prior to exiting through the outlet orifice 170 as an atomised spray. Once the cap has been fully depressed or when the user stops pressing the cap 114, the pressure in the pump chambers 122, 123 falls and the outlet valves 184b, 190 close.

When the user removes the actuation force from the cap 114, the resilience of the flexible insert 116 and the upper bell 184 in particular, biases the cap 114 back towards the rest position. As the cap 114 is moved back towards its rest position, the volumes of the main and secondary chambers 122, 123 increase and the pressure in the chambers falls creating a partial vacuum. Once the pressure in the main pump chamber 122 has fallen to a predetermined value, the inlet valve 185 opens and a fresh charge of liquid is drawn into the chamber. A fresh charge of air is also admitted as the reduced pressure in the secondary pump chamber 123 allows atmospheric air to push the further frusto-conical extension 186e of the lower bell away from the wall of the cap 114. By the time the cap 114 has fully recovered to its rest position, both the main and secondary pump chambers are fully charged ready for a further actuation. The user can then either depress the cap 114 again to dispense further liquid or twist the cap to the locked position for storage.

The flexible insert 116, and in particular the upper bell 184, can be strengthened by adding reinforcing ribs or struts to increase the spring force with which the cap 114 is biased back to the rest position. FIG. 11 illustrates the dispenser 10 as the cap 114 reaches its fully depressed position in mid-actuation. The tubular region 184b of the insert is shown deflected away from the inner annular wall 150 of the collar 148 to open a flow path from the main pump chamber 122 to the outlet 144. The flexible insert portion 190 has also been deflected to open a flow path through the second opening 174 from the secondary pump chamber to the outlet 144. It should be noted that the dispenser is designed to minimise the dead space in the pump chambers 122, 123 when the cap 114 is fully depressed.

Dispensers 110 in accordance with the invention can be manufactured using any suitable methods and apparatus. However, the container 116 and cap 114 can be cost effectively manufactured using the stacked injection/blow moulding apparatus and methods described above in relation to FIGS. 1 to 4, with a preform for the container being injection moulded in the upper station 12 and blown in the lower station 14. The neck region 120 of the container may be moulded in the upper station 12 or in the lower station 14 during the blow moulding phase. In some instances, part of the neck will be moulded in the upper station whilst additional features are added in the lower station. The cap 114 can also be injection moulded in the lower station 114 with suitable impressions in a split mould. Where the outlet 144 includes a spray nozzle insert 166, this can also be moulded in the lower station together with the cap. The flexible insert 116 will usually be manufactured in a separate injection moulding machine and assembled to the dispenser. As illustrated in FIG. 7, the insert is first assembled to the cap 114 which is then pushed on to the neck region 120 of the container and fully depressed so that the flexible insert 116 engages in the neck 120. The dispenser can then be primed.

In order to reduce the tooling space required, the mould for the cap 114 will usually be positioned above a shoulder region of the blow moulding cavity for the container 112. This enables the number of units that can be produced in a single tool to be maximised. In many applications, the main body 118 of the container will be larger than that shown in the drawings and may have a non-circular (e.g. oval or elliptical) shape in horizontal cross section so that it is wider when viewed from the front or rear than from the sides. In this case there will be sufficient room for the whole of the mould for cap 114 to be positioned above the blow mould cavity for the container but even where the container is small or circular, the mould for the cap can be positioned minimise the overall footprint of the moulds for the container and cap.

In the present embodiment, the cap 114 is moulded with a flexible lanyard 192 connecting it to the container 112. This is preferable as it minimises the assembly process and reduces the overall number of separate parts that must be produced and controlled. However, the lanyard could be omitted. The lanyard is flexible to allow the cap 114 to be fitted to the container 112 and to allow the cap 114 to fall vertically upside down adjacent the container to make it easy to assemble the insert. The cap 114 and lanyard 192 can be arranged so that the cap rests on a shoulder or side wall of the container when the insert 116 is assembled.

Figure 12:
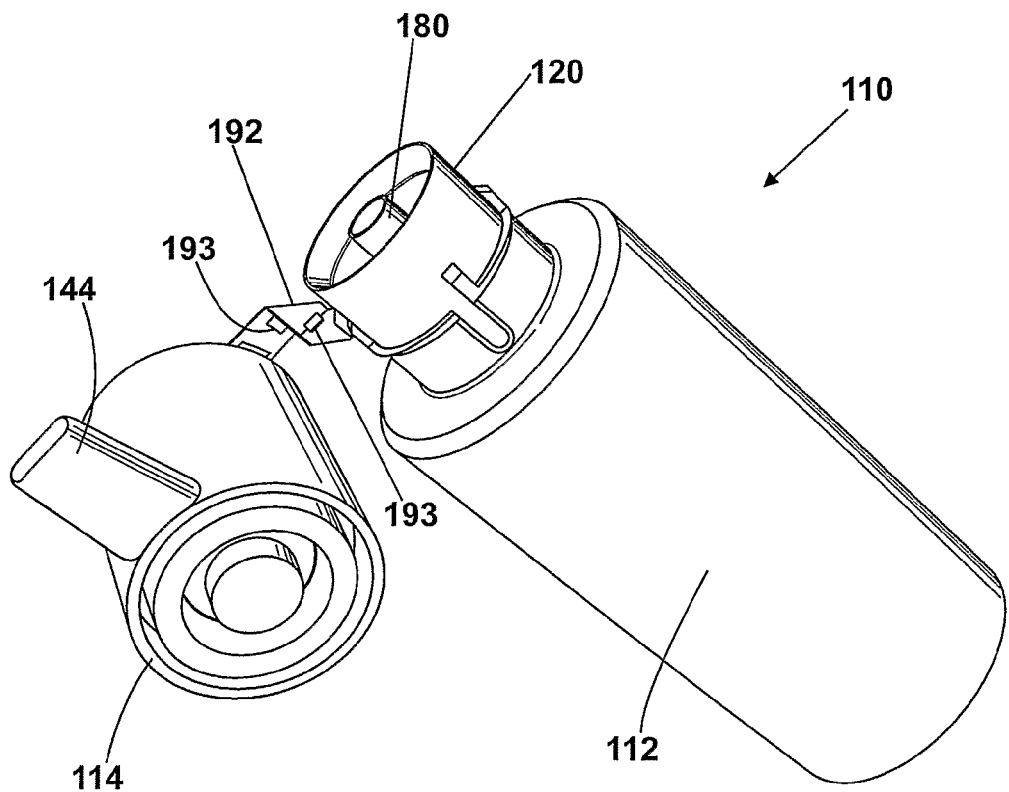
FIG. 12 is a perspective view of a further embodiment of a dispenser in accordance with the invention.
Figure 13:
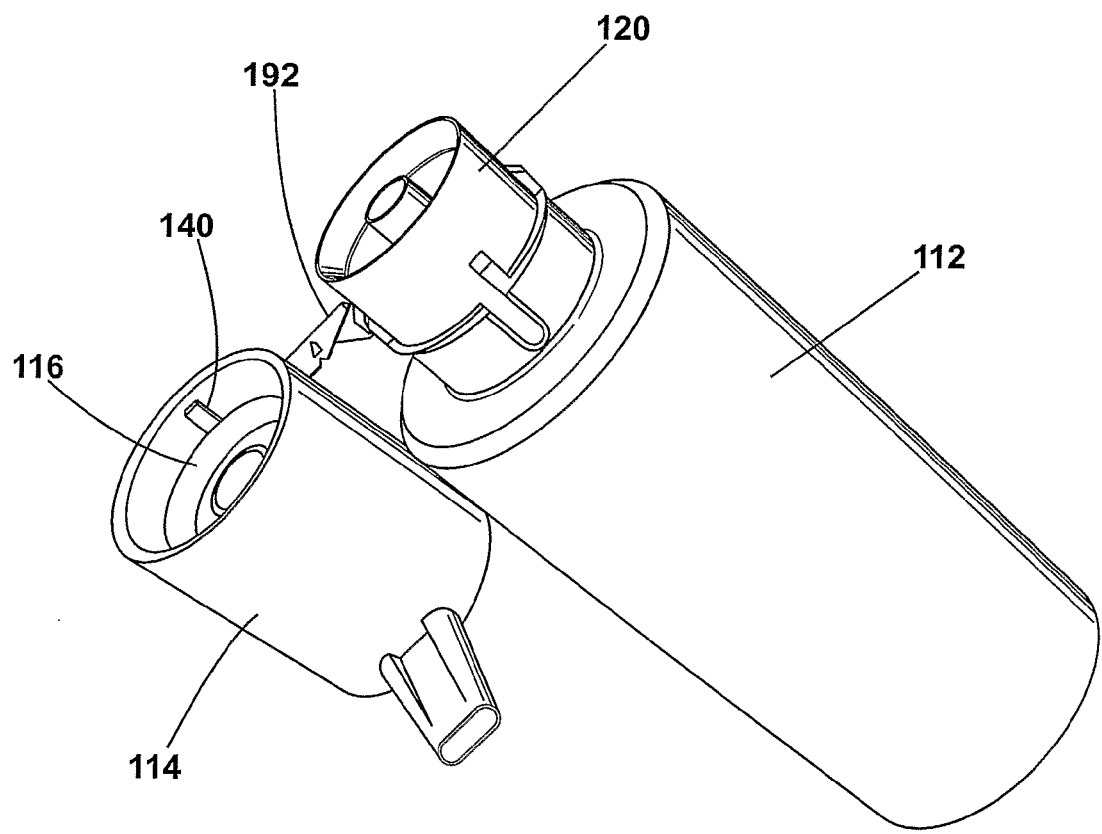
FIG. 13 is a view similar to that of FIG. 12 but shown the cap after insertion of a flexible insert.

FIGS. 12 and 13 show a modified dispenser 110 in which the lanyard 192 is adapted to twist. This arrangement is beneficial as it enables the cap 114 to be moulded horizontally, as shown in FIG. 12, with the underside being made in one part of a split mould tool and the topside in the other part of the tool. In this configuration the outlet spout 144 extends vertically and can be formed using retractable pins. As shown in FIG. 13, when the container 112 and cap 114 are removed from the mould, the lanyard twists to enable the cap 114 to fall upside down adjacent the container. The lanyard 192 is formed with a series of openings 193 at different angles to allow the twisting to occur. The lanyard 192 in this and all embodiments can be manufactured with frangible links to the cap 114 and container 112 so that it can be easily removed after the cap 114 has been assembled to the container 112 or on first use of the dispenser.

Whilst it is advantageous for the cap to be moulded together with the container and connected by a lanyard, it will be appreciated that the cap could be moulded separately from the container. The dip tube 180 can be moulded integrally with the container by producing a preform having multiple layers as described above in relation to the modified moulding apparatus 10' shown in FIG. 4. In this case, the dip tube is formed from an inner layer of preform. When the preform is blown, only the outer layer or layers are expanded to form the main body of the container 112 whilst the inner layer remains unexpanded or may even be reduced in size to form the dip tube 180. The inlet hole at the base of the dip tube 180 can be formed by lifting part of the sleeve inside which the dip tube layer is moulded and blowing air into the dip tube to burst a hole though the base of the dip tube layer. It is an advantage of having an integral dip tube 180 that the tube is filled when the container 112 is filled. This reduces the amount of priming required.

In many applications it will be desirable to produce the cap 114 in a different colour to the container 112. This can be achieved using the apparatus 10, 10' described above by feeding the desired colour(s) into the runner for one or both of the cap 114 and container 112 rather than mixing it in the barrel. In this way any desired colour combination can be produced.

The dispenser 110 described can be modified in a variety of ways. For, example, where there is no requirement to mix air with the liquid in the outlet nozzle 144, the secondary pump chamber 123 can be omitted. In this case the lower bell 186 need not be provided with the further frusto-conical extension 186e and the second opening 174 into the outlet 144 can also be omitted. Alternatively where it is desired to dispense two liquids, the container 112 can be divided into two by means of an internal wall with a dip tube 180 extending into each part. In, this configuration, the flexible portion 116 would be modified so as to fluidly connect one dip tube to the main pump chamber 122 and the other to the secondary pump chamber 123 and to form an inlet valve for each dip tube. Where the dispenser has two chambers to dispense two fluids, the two fluids can be mixed in the nozzle or they can be directed through separate outlets to be mixed in the air externally of the dispenser nozzle.

Figure 14:
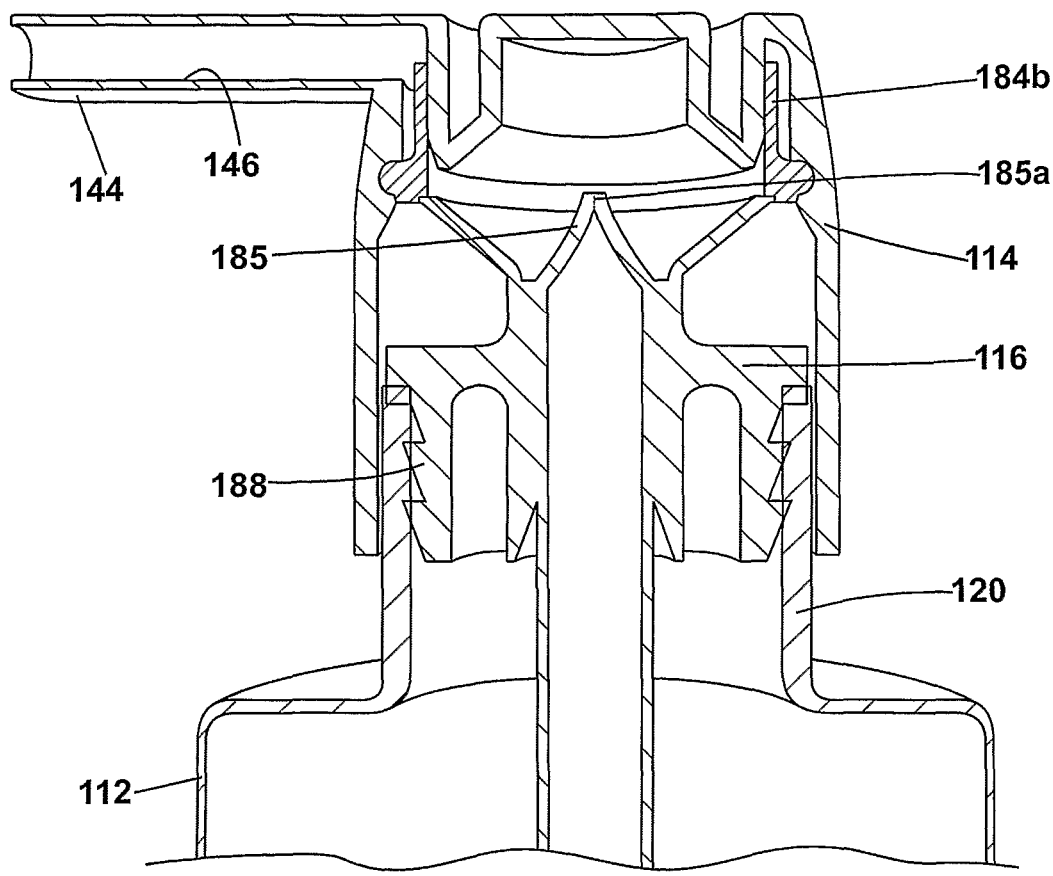
FIG. 14 is a view similar to that of FIG. 8 of a further alternative embodiment of a dispenser in accordance with the invention.
Figure 15:
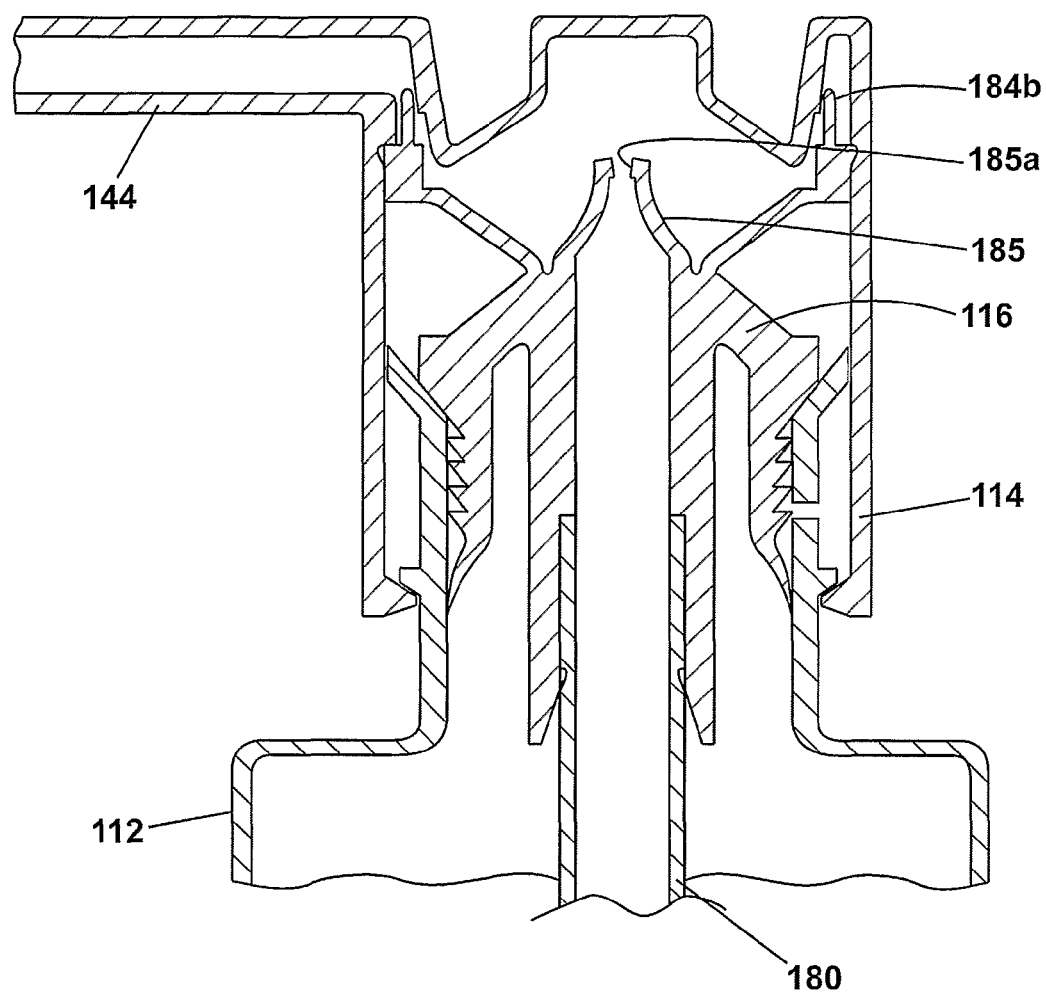
FIG. 15 is a view similar to that of FIG. 14, showing the dispenser of FIG. 14 during a recovery phase with an inlet valve open.

FIGS. 14 and 15 illustrate an embodiment of a dispenser 110 having only a single pump chamber 122. The flexible insert 116 in this embodiment is similar to that described above in relation to FIGS. 10 and 11 in that it is held in the neck region 120 of the container by a series of fins 188 and the inlet valve 185 to the pump is in the form of a duck or fart valve. Because this embodiment does not have a secondary pump chamber, the further frusto-conical extension 186e of the flexible insert 116 is omitted.

Figure 16:
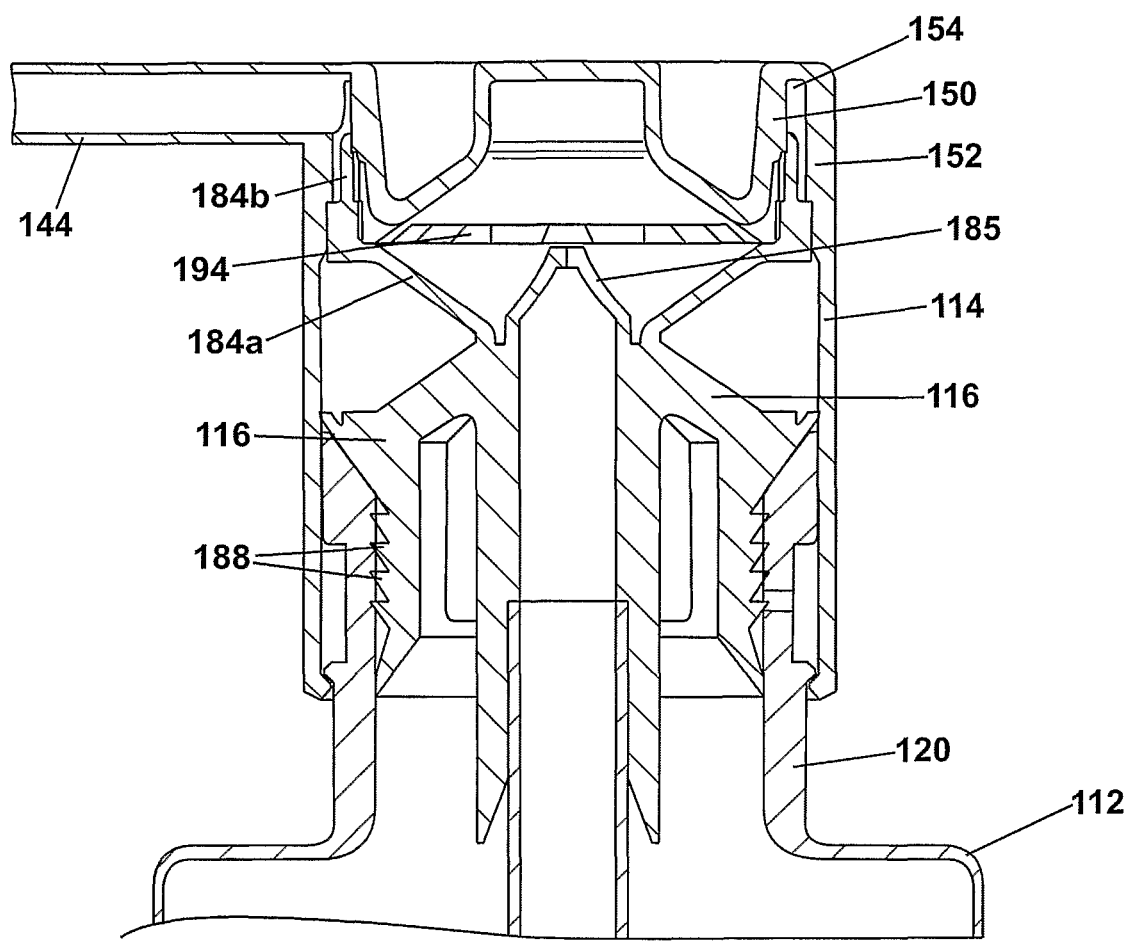
FIG. 16 is view similar to that of FIG. 8 of a yet further alternative embodiment of a dispenser in accordance with the invention.

A further modified embodiment of the dispenser 10 is illustrated in FIG. 16. This embodiment is similar to that described above in relation to FIGS. 10 and 11 and comprises a duck or fart type inlet valve 185 to the main pump chamber 122. A further modification involves the method of attaching the upper bell portion 184 to the cap 114. Rather than having a semi-circular seal 184c engaging in a groove 160 as in previous embodiments, the upper bell portion 184 has region of increased thickness 184d at the junction between the frusto-conical region 184a and the tubular portion 184b which extends between and is held in recesses in the inner and outer annular walls 150, 152 of the cap. Openings 194 are provided through the inner wall 150 through which the liquid can flow into the annular channel 154 between the inner and outer walls when the tubular region 184b which functions as an outlet valve is deflected outwardly.

Dispensers in accordance with the invention can be modified to incorporate a trigger actuator. This can be achieved by adding hinge formations to the neck region 120 of the container and providing a separate trigger actuator which is assembled to the hinge formations and which fits over the cap 114. The actuator may have an opening through which the outlet 144 projects.

Figure 17:
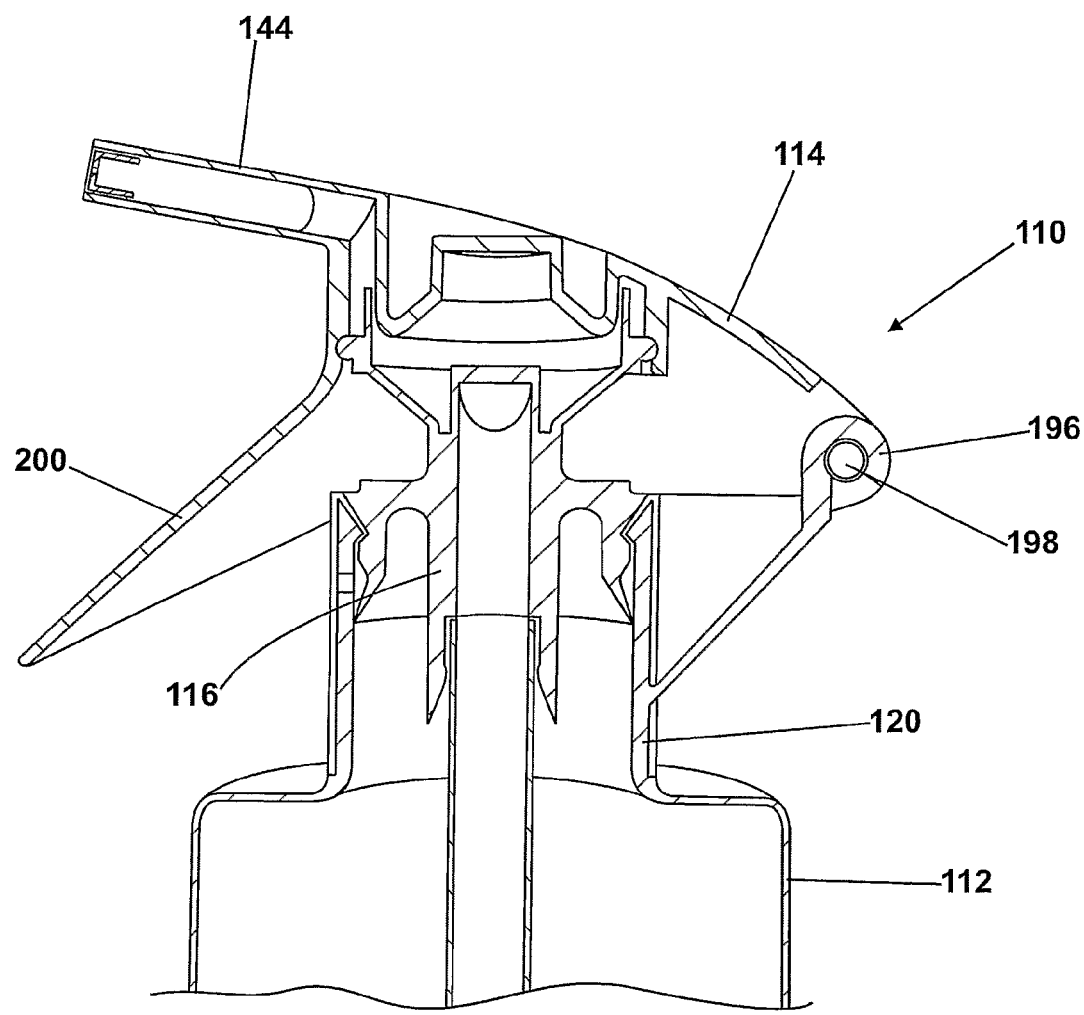
FIG. 17 is view similar to that of FIG. 8 of a still further alternative embodiment, of a dispenser in accordance with the invention with a trigger actuator; and, FIG. 18 is a view similar to that of FIG. 8 showing a further embodiment of a dispenser in accordance with the invention and which is adapted to dispense a mixture of liquid product and air as foam.

Alternatively, the cap 114 can be modified to incorporate an integral trigger actuator as illustrated in FIG. 17. In this embodiment, one or more hook like portions 196 are moulded onto one side of the neck region 120 of the container. The cap 114 is provided with corresponding rod sections 198 which engage in the hooks 196 to form a hinge about which the cap 114 pivots. The cap 114 has a trigger portion 200 which can be gripped by a user to actuate the dispenser. Any of the embodiments described can be modified to incorporate a trigger actuator, including the dispensers with two pump chambers.

Dispensers in accordance with the invention can be adapted for use as dosing dispensers by varying the size the main pump chamber 122 to control the discharge or dose of liquid dispensed on each actuation. Dosing dispensers can have many applications including dispensing of pharmaceuticals. A dosing dispenser may include a secondary chamber 123 for mixing air with the liquid or dispensing two liquids. The volume of the secondary chamber 123 can also be fixed to provide a dual dispensing pump.

Whilst is its preferred that the inlet and outlet valves for the main, and where present, secondary pump chambers are formed by the flexible insert 116, alternative valve arrangements can be used. For example any of the valves could be replaced by a valve insert, which may comprise a ball type valve for example.

Figure 18:
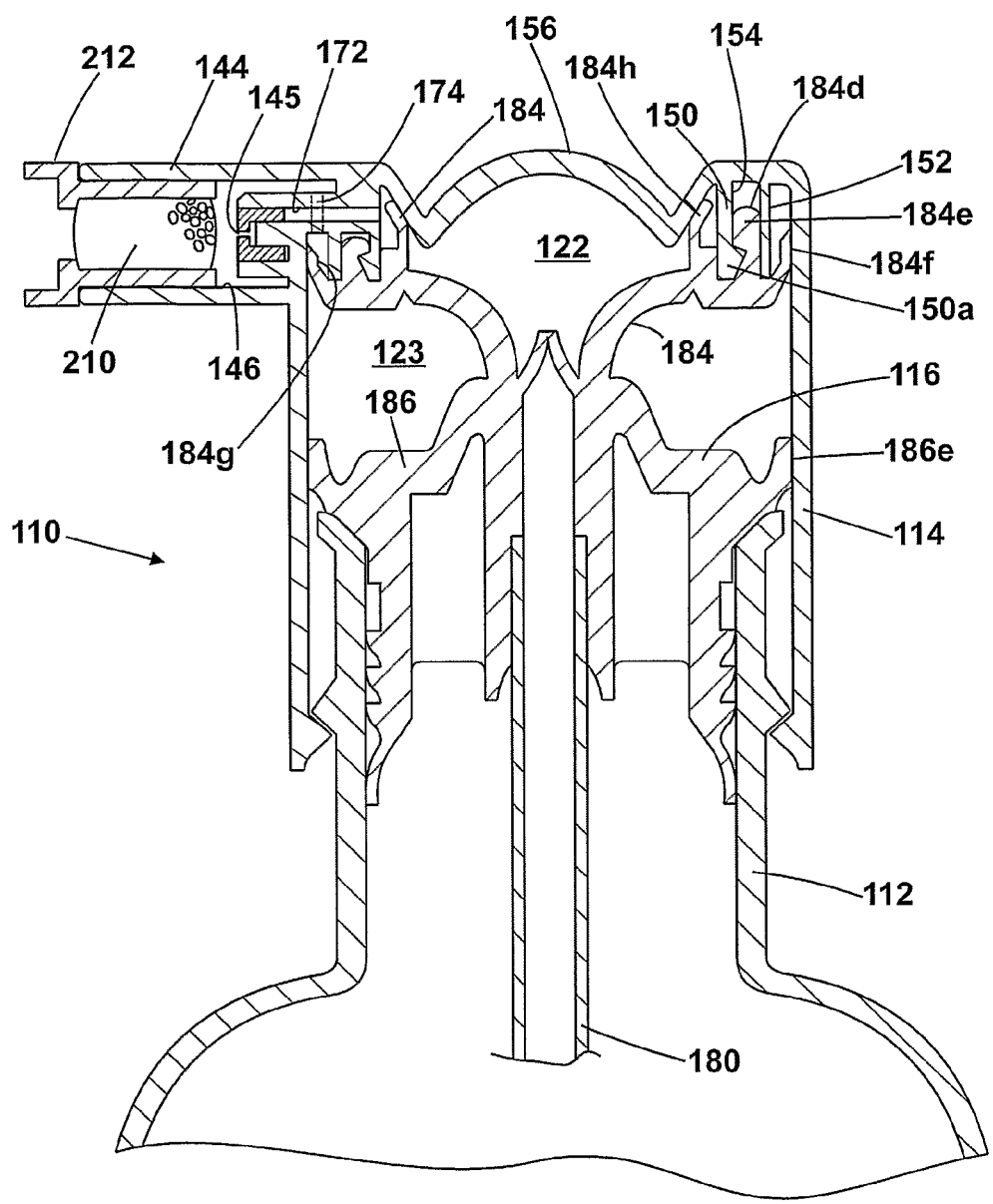

The outlet 144 of the dispenser can be modified in a variety of ways depending on the type of fluid being dispensed. Where the fluid is to be dispensed as a foam, for example, a filter mesh can be incorporated into the outlet. FIG. 18 illustrates an embodiment of a dispenser 110 which is adapted to dispense a mixture of air and a liquid product as a foam.

The dispenser 110 in FIG. 18 is similar to the dispenser 110 described above with reference to FIGS. 5 to 11 and comprises a flexible insert 116 which defines a main pump chamber 122 for dispensing a liquid product from a container and a secondary pump chamber 123 for dispensing air to be mixed with the liquid product in the outlet 144. In this embodiment, the outlet 144 comprises an elongate spout having a large diameter outlet passage 146 surrounding an atomizing or spray outlet 145 through which the liquid product is sprayed into the passage 146 from the main pump chamber 122. The air from the secondary chamber 122 is introduced directly into the outlet passage 146 from the secondary pump chamber though an air outlet passage 174 where it mixes with the liquid product to produce a foam. Means for refining the foam can be included in the outlet passage 146. This might include one or more mesh filter screens as is well known in the art. However, in the present embodiment, a plug 210 of open celled foam or another suitable three dimensional meshes structure is located in the outlet passage 146. For convenience, the plug 210 may be held in an insert 212 which locates in an outer end of the outlet passage 146 as shown or it may be located directly in the outlet passage.

The dispenser 110 as shown in FIG. 18 is otherwise constructed and operated in a similar way to the dispenser 110 in FIGS. 5 to 11 described above. The main differences being the way in which the upper bell 184 is located within the cap 114 and the air release arrangements.

In the present embodiment, the upper bell 114 of the flexible insert has a flange 184d which is received in the annular gap 154 between the two spaced annular walls 150, 152 which project inwardly from the upper surface of the cap 114. The inner annular wall 150 and the flange 184d have inter-engaging formations 184e, 150a which lock the flange 184d in position. An outer lip seal 184f engages with inner surface of the side wall of the cap to define together with the lower bell 186 and the side wall of the cap 114 the secondary air chamber 123. Part 184g of the lip seal 184f adjacent the air outlet passage 174 acts as an outlet valve for the secondary chamber and can be deflected inwardly away from the wall to allow air to enter the air outlet passage 174 when the dispenser is actuated. The lower bell has a seal 186e which engages the wall of the cap to seal the lower end of the secondary chamber. As with the embodiment shown in FIGS. 5 to 11 and described above, the seal 186e acts as a one way valve to admit atmospheric air, into the secondary chamber 123 as the cap 114 recovers to the rest position after each actuation.

A second lip seal 184h on the upper bell 184 engages with an upper surface of the cap 114 to define the main liquid pump chamber 122 between the upper bell 184 and the upper surface of the cap. At least part 184i of the second lip seal 184h adjacent the liquid outlet passage 172 acts as a pre-compression valve to control the release of liquid from the main pump chamber 122 when the pump is actuated. Thus, when the cap 114 is depressed, the pressure of the liquid in the main pump chamber 122 is increased. The increasing pressure of the liquid in the main pump chamber acts on the second lip seal 184h causing at least the portion 184i to deflect away from the cap to allow the liquid to enter the passage 172 when the pressure of the liquid reaches a predetermined desired value.

In this embodiment, the inlet valve for the main pump chamber 185 is in the form of a duck bill or fart type valve.

Due to the incompressibility of the liquid in the main pump chamber, the pressure of the air in the secondary chamber 123 will not be raised significantly before the outlet valve for the liquid chamber 122 opens. Consequently, the air from the air chamber 123 will be delivered to the outlet passage substantially at atmospheric pressure and the outlet valve 184g for the air chamber can be configured to open at the same time as or just before or just after the outlet valve 184i.

Typically the dispenser 110 will deliver the air and liquid at a ratio in the range of 6:1 to 10:1 by volume. If necessary, the volume of the air chamber 123 can be increased by making the diameter of the cap larger than is shown and the cap may have a diameter which is significantly larger than that of the neck region 120.

In some circumstances, it may be desirable to raise the pressure of the air in the air chamber 123 above atmospheric. In this case, the dispenser can be modified to enable the volume of the air chamber 123 to be reduced before the liquid chamber outlet valve 184i opens. This can be achieved in a number of ways. For example a balloon or other compressible body containing a gas may be located within the liquid chamber. When the dispenser is actuated, the balloon or body will compress initially to allow the cap to move relative to the neck 120 so that the volume of the air chamber is reduced and the air pressure increased before the pressure of the liquid in the main chamber 122 is raised.

In the present embodiment, there is no opening 134 through the neck 120 to admit air into the container. Rather a small air passage (not shown) is provided between the flexible insert 116 and the inner surface of the neck through which air can be admitted into the container. The passage may be open all the time or the insert may be configured so that a passage is formed when the pressure in the container is below atmospheric. This arrangement can be adopted in any of the embodiments described in the application instead of the air hole 134.

In the present embodiment, a central region 156 of the upper surface of the cap 114 is indented and shaped like a dome. This is to reduce the amount of dead space in the main chamber 122. However, in this and the other embodiments, the upper surface of the cap could be provided as a simple flat surface. In addition, dispenser in accordance with the invention may be provided with only one concentric annular wall 150, 152 in the cap. In all the embodiments described above, the dispenser pump is formed integrally with the container. This arrangement is advantageous as it provides a very cost effective way of manufacturing a combined container and pump dispenser with a minimum of parts and assembly steps. However, in certain applications it may be desirable to provide a pump dispenser separately from the container. Many advantages of the dispenser in accordance with the invention can still be achieved in this way. To achieve this end, the first or base part 112 of the dispenser pump, which in disclosed embodiments is formed by the neck region of the container, is formed as a separate component from the container and is adapted to be mounted to a container. The first or base part 112 could be adapted to be mounted to the neck of a container by means of a screw thread or other twist fit arrangement, for example.

Dispensers in accordance with the invention are simple in construction and therefore relatively cheap to manufacture and yet highly effective. With all the flexible valve members for inlet and outlet valves of the or each chamber being formed integrally with the flexible insert, the dispenser comprises only three separate component parts, the cap, the base part (which may also comprises the container, and the insert. Where the cap and the base part are moulded together and interconnected by a lanyard, the dispenser will comprise only two separate component parts.

In addition, the same basic design can be modified to provide a range of pumps. Thus the same cap 114 and base parts 112 can be used to form a single chamber pump or a dual chamber pump by using a modified flexible insert 116. The outlet 144, 144' of the cap can be moulded by means of an insert in the mould tool which is interchangeable so that the same basic tool can be used to produce cap actuators 114 having different outlet arrangements, e.g. spray nozzle, foam dispenser etc. In addition, a range of pump sizes can be produced by modifying the insert 116 and actuator cap 114. Alternatively, the discharge volume of the dispenser can be changed by providing cooperating stops on the cap 114 and the base part 112 to limit the range of movement of the cap 114 relative to the base part 112 to less than its potential maximum range of movement. The position of the stops can be varied to provide range of pumps having different discharge volumes but using the same basic cap 114, base part 112 and insert 116. The stops can be produced by means of inserts on the mould tool thus enabling a range of pumps to be manufactured using the same basic tooling. All of this enables a new pump range to be brought to market with significantly reduced tooling costs when compared to the prior art in which separate tooling is required for each pump size and type.

Whereas the invention has been described in relation to what is presently considered to be the most practical and preferred embodiments, it is to be understood that the invention is not limited to the disclosed arrangements but rather is intended to cover various modifications and equivalent constructions included within the spirit and scope of the invention. For example, the flexible insert 116 can be configured to extend over the outside of the neck 120 in some cases. In some embodiments the dispenser may be adapted to work upside down. In such arrangements, the dispenser may not have a dip tube. Instead, the liquid to be dispenses will be contained in a flexible bag having an outlet in fluid connection with the inlet to the main pump chamber. Where two liquids are to be dispensed, the two liquids can each be held in a flexible bag having an outlet in fluid connection with a respective pump chamber.

The invention claimed is:

1. A manual pump action dispenser for dispensing at least one liquid from a container, the dispenser comprising a base and a cap having an outlet for the liquid, the base being mountable to or forming part of a container and the cap being mountable to the base for movement relative to the base between a rest position and an actuated position, the dispenser further comprising a flexible insert locatable between the base and the cap to define a first pump chamber for dispensing said at least one liquid, the insert being a single unitary element adapted to engage with the base to define an inlet through which said at least one liquid to be dispensed can enter the first pump chamber, the dispenser further comprising an inlet valve operable to enable liquid to enter the first pump chamber through the inlet and an outlet valve arrangement operable to control the release of liquid from the first pump chamber through the outlet, the insert also defining a second pump chamber for dispensing a second fluid, the insert comprising a main body portion, a first flexible diaphragm member which extends generally radially outwardly from the main body for contact with an inner surface of the cap to define one of the first and second pump chambers between itself and a closed end of the cap, the insert having a second flexible diaphragm member extending generally radially outwardly from the main body for contact with an inner surface of the cap, the other of the first and second pump chambers being defined inside the cap between the first and second diaphragm members.

2. A manual pump dispenser as claimed in claim 1, in which an integral portion of the insert forms a flexible valve member of the first pump chamber inlet valve.

3. A manual pump dispenser as claimed in claim 1, in which a portion of the flexible insert forms a flexible valve member of the first pump chamber outlet valve.

4. A manual pump dispenser as claimed in claim 1, in which an integral portion of the insert forms a flexible valve member of an inlet valve for the second pump chamber.

5. A manual pump dispenser as claimed in claim 1, in which an integral portion of the insert forms a flexible valve member of an outlet valve for the second pump chamber.

6. A manual pump dispenser as claimed in claim 4, in which the second pump chamber is configured to dispense air and the inlet valve for the second pump chamber is configured to open so as to admit ambient air into the second pump chamber when the pressure in the second pump chamber is lower than the ambient air pressure by a predetermined amount.

7. A manual pump chamber as claimed in claim 1, in which the second pump chamber is configured to dispense a second liquid, the insert defining a second inlet through which the second liquid may be drawn into the second pump chamber.

8. A manual pump dispenser as claimed in claim 1, in which the main body portion defines a bore forming part of the inlet to the first pump chamber, the insert being mountable to a dip tube so that the dip tube is in fluid connection with the bore.

9. A manual pump dispenser as claimed in claim 8, in which the second pump chamber is configured to dispense a second liquid, the main body portion defining a second bore forming part of an inlet through which the second liquid may be drawn into the second pump chamber, the insert being mountable to a second dip tube so that the second dip tube is in fluid connection with the second bore.

10. A manual pump dispenser as claimed in claim 1, in which the base has an annular wall or neck, the cap having an annular side wall extending from the closed end which locates about the outside of the neck, at least part of the insert being received within the neck.

11. A manual pump dispenser as claimed in claim 10, in which the main body is at least partially received within the neck, the second diaphragm member extending from the main body to contact and form a seal with an inner surface of the neck, the second diaphragm member bell carrying a seal member which contacts the side wall of the cap in spaced relation from the first diaphragm member.

12. A manual pump dispenser as claimed in claim 11, in which the main body portion defines a bore forming part of the inlet to the first pump chamber, the insert being mountable to a dip tube so that the dip tube is in fluid connection with the bore, and in which the insert has one or more flexible valve members configured to allow a first liquid to flow through the bore into the first pump chamber but not in the reverse direction.

13. A manual pump dispenser as claimed in claim 12, in which the second pump chamber is configured to dispense a second liquid, the main body portion defining a second bore which opens into the second pump chamber and which forms part of an inlet to the second pump chamber through which the second liquid may be drawn into the second pump chamber, the insert being mountable to a second dip tube so that the second dip tube is in fluid connection with the second bore, the insert having one or more flexible valve members configured to allow a second liquid to flow through the second bore into the second pump chamber but not in the reverse direction.

14. A manual pump dispenser as claimed in claim 1, in which the base is adapted to be mounted to an outlet of a container for the at least one liquid.

15. A manual pump dispenser as defined in claim 1, in which the first diaphragm member comprises a generally frusto-conical portion that extends away from the body portion and a seal region of enlarged thickness which engages with the cap.

16. A manual pump dispenser as claimed in claim 1, in which the first diaphragm member comprises a portion that engages with a surface of the cap to define a pump chamber outlet valve member, the outlet valve member being resiliently biased into contact with the surface to close an outlet passage connecting the pump chamber and the liquid outlet in the cap.

17. A manual pump dispenser as claimed in claim 16, in which the cap comprises inner and outer annular wall members which define between themselves an outlet channel for the pump chamber, the outlet valve member being resiliently biased to contact one of the wall members to close the outlet of the pump chamber.

18. A manual pump dispenser as claimed in claim 10, in which the second diaphragm member has a shoulder region which rests on a flange formed at an outer end of the neck.

19. A manual pump dispenser as claimed in claim 18, in which the second diaphragm member extends into the neck beyond the flange for contact with an inner surface of the neck and is resiliently biased into contact with the inner surface of the neck the second diaphragm member forming an inlet valve member for controlling the admission of air into the container during use.

20. A manual pump dispenser as claimed in claim 1, in which the second pump chamber is configured to dispense air for mixture with the liquid, the second diaphragm member having a seal member for contact with an inner surface of the cap, the seal member being configured to act as an inlet valve member to control the admission of ambient air into the second pump chamber during use.

21. A manual pump dispenser as claimed in claim 20, in which a fluid passage connects the second pump chamber with the outlet in the cap, a portion of the flexible insert being configured to act in use as an outlet valve member for controlling the release of fluid from the second pump chamber into the outlet.

22. A manual pump dispenser as claimed in claim 1, in which the dispenser further comprises a trigger type actuation surface adapted to be gripped by a user's fingers and pulled towards the container to actuate the dispenser.

23. A manual pump dispenser as claimed in claim 22, in which the cap is mounted to the base or container for pivotal movement between the rest and actuated positions, the trigger type actuation surface being formed integrally with the cap.

24. A manual pump action dispenser for dispensing a liquid from a container, the dispenser comprising a base and a cap having an outlet for the liquid, the base being mountable to or forming part of the container and the cap being mountable to the base for movement between a rest position and an actuated position, the dispenser further comprising a flexible insert locatable between the base and the cap to define a pump chamber for the liquid, the insert being adapted to engage with the base to define an inlet through which the liquid to be dispensed can enter the pump chamber, the dispenser further comprising a one way inlet valve operable to enable liquid to enter the pump chamber through the inlet and a one way outlet valve arrangement operable to control the release of liquid from the pump chamber into the outlet, the dispenser having a trigger type actuation surface adapted to be gripped by a users fingers and pulled towards the container to actuate the dispenser.

25. A manual pump dispenser as claimed claim 6, in which the dispenser is a foam dispenser.

26. A manual pump dispenser as claimed in claim 25, in which outlet passageways are provided in the cap to connect the first and second pump chambers with the outlet, the outlet passageways from the first and second converging such that, in use when the dispenser is actuated, air from the second pump chamber is mixed with the at least one liquid from the first pump chamber in an outlet passage.

27. A manual pump chamber as claimed in claim 25, in which the dispenser comprises an outlet passage through which the mixture of air and the at least one liquid passes before being dispensed, at least one foam refining filter being located in the outlet passage.

28. A manual pump dispenser as claimed in claim 27, in which the filter comprises at least one filter screen.

29. A manual pump dispenser as claimed in claim 25, in which the dispenser outlet includes a fluid flow passageway from the first pump chamber having a spray orifice which opens into an outlet passageway of increased diameter, the outlet from the second pump chamber comprising a fluid flow passageway which enters the increased diameter outlet passage.

30. A manual pump dispenser for dispensing a fluid, the dispenser comprising a base and a dispensing cap having an outlet mounted to the base, the dispenser further comprising a single unitary insert mountable between the base and the cap to define at least one pump chamber between itself and the cap, the insert being adapted to engage with the base to define an inlet through which a fluid can be drawn into the pump chamber from a fluid source, in which the insert comprises a central core and a resiliently flexible diaphragm member projecting upwardly and generally radially outwardly from the core for contact with the cap to at least partially define the at least one pump chamber within the cap, the insert being movable between an initial resiliently biased configuration in which the volume of the at least one pump chamber is at a maximum and a deformed configuration in which the volume of the at least one pump chamber is at a minimum, in the deformed configuration, the upper diaphragm being at least partially folded down about itself and/or the core.

31. The manual pump dispenser as claimed in claim 1, wherein the second flexible diaphragm member comprises a seal adapted for sliding contact with an inner surface of the cap to permit relative movement between the second flexible diaphragm and the cap.

32. The manual pump dispenser as claimed in claim 30, wherein said insert is configured such that said central core does not compress during normal use.

* * * * *